(12) United States Patent
Ogawa

(10) Patent No.: US 8,233,678 B2
(45) Date of Patent: Jul. 31, 2012

(54) IMAGING APPARATUS, IMAGING METHOD AND COMPUTER PROGRAM FOR DETECTING A FACIAL EXPRESSION FROM A NORMALIZED FACE IMAGE

(75) Inventor: Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 987 days.

(21) Appl. No.: 12/190,998

(22) Filed: Aug. 13, 2008

(65) Prior Publication Data

US 2009/0046900 A1 Feb. 19, 2009

(30) Foreign Application Priority Data

Aug. 14, 2007 (JP) ................................. 2007-211199

(51) Int. Cl.
*G06K 9/00* (2006.01)
(52) U.S. Cl. ..................... 382/118; 348/14.12
(58) Field of Classification Search .................. 382/118
See application file for complete search history.

(56) References Cited

U.S. PATENT DOCUMENTS

| 8,005,268 B2* | 8/2011 | Steinberg et al. ............. 382/117 |
| 2001/0052928 A1* | 12/2001 | Imagawa et al. ........... 348/14.12 |
| 2002/0102024 A1 | 8/2002 | Jones et al. |
| 2004/0218916 A1 | 11/2004 | Yamaguchi et al. |
| 2005/0280809 A1 | 12/2005 | Hidai et al. |
| 2006/0115157 A1 | 6/2006 | Mori et al. |
| 2006/0147192 A1 | 7/2006 | Zhang et al. |
| 2006/0222214 A1 | 10/2006 | Kaneda et al. |

FOREIGN PATENT DOCUMENTS

| CN | 1584917 A | 2/2005 |
| CN | 1794265 A | 6/2006 |
| EP | 1 648 166 A2 | 4/2006 |
| EP | 1 748 378 A1 | 1/2007 |
| JP | 11-250266 | 9/1999 |
| JP | 2002-255647 | 9/2002 |
| JP | 2004-252394 | 9/2004 |
| JP | 2005-56387 | 3/2005 |
| JP | 2005-157679 | 6/2005 |

(Continued)

OTHER PUBLICATIONS

Chinese Office Action issued Apr. 13, 2011, in Patent Application No. 200810146285.4 (with English-language translation).

(Continued)

*Primary Examiner* — Hadi Akhavannik
(74) *Attorney, Agent, or Firm* — Oblon, Spivak, McClelland, Maier & Neustadt, L.L.P.

(57) ABSTRACT

An image processing apparatus for processing an image, includes a face detector for detecting an image of a face of a subject contained in a captured image, based on image information of the captured image supplied from an imaging unit, a face feature detector for detecting a face feature contained in the face image, based on image information of the face image detected by the face detector, a normalizer for normalizing the face image detected by the face detector, based on a detected position of the face feature detected by the face feature detector and generating a normalized face image, and a face expression detector for detecting a face expression contained in the face image, based on image information of the normalized face image generated by the normalized.

13 Claims, 21 Drawing Sheets

FOREIGN PATENT DOCUMENTS

| | | |
|---|---|---|
| JP | 2006-115406 | 4/2006 |
| JP | 2007-36586 | 2/2007 |
| JP | 2007-150601 | 6/2007 |
| JP | 2008-186303 | 8/2008 |

OTHER PUBLICATIONS

Office Action issued Jun. 7, 2011, in Japanese Patent Application No. 2007-211199.

Paul Viola, et al., "Rapid Object Detection using a Boosted Cascade of Simple Features", Accepted Conference on Computer Vision and Pattern Recognition, 2001, pp. 1-9.

Office Action issued Jun. 2, 2010, in China Patent Application No. 200810146285.4 (with English translation).

European Summons to Attend Oral Proceedings issued on Sep. 29, 2011 in corresponding European Application No. 08 160 510.7.

L. C. Jain et al., "3.5 Normalization and Vectorization of Images", intelligent Biometric Techniques in Fingerprint and Face Recognition, © 1999 by CRC Press LLC, p. 237.

U.S. Appl. No. 12/104,036, filed Apr. 16, 2008, Ogawa.

U.S. Appl. No. 12/139,741, filed Jun. 16, 2008, Ogawa.

\* cited by examiner

IMAGE IN STORAGE UNIT

DETECTION BY FACE DETECTOR

NORMALIZING

FACE SCORE MEASUREMENT
(AdaBoost strong classifier)

FACE DICTIONARY

FIG. 15A
LEFT-EYE SCORE MEASUREMENT
(AdaBoost strong classifier)

score_Ley = 0 pix_ey1(i) - pix_ey2(i) < $\theta$_ey(i)
TRUE:
  score_Ley = score_ey + $\alpha$_ey(i)
FALSE:
  score_Ley = score_ey - $\alpha$_ey(i)

} REPEATED BY t1 TIMES score_Ley > (NON-ZERO VALUE, SUBJECT TO A MODEST DEGREE OF ADJUSTMENT, IS ALSO ACCEPTABLE)

TRUE: EYE
FALSE: NOT EYE

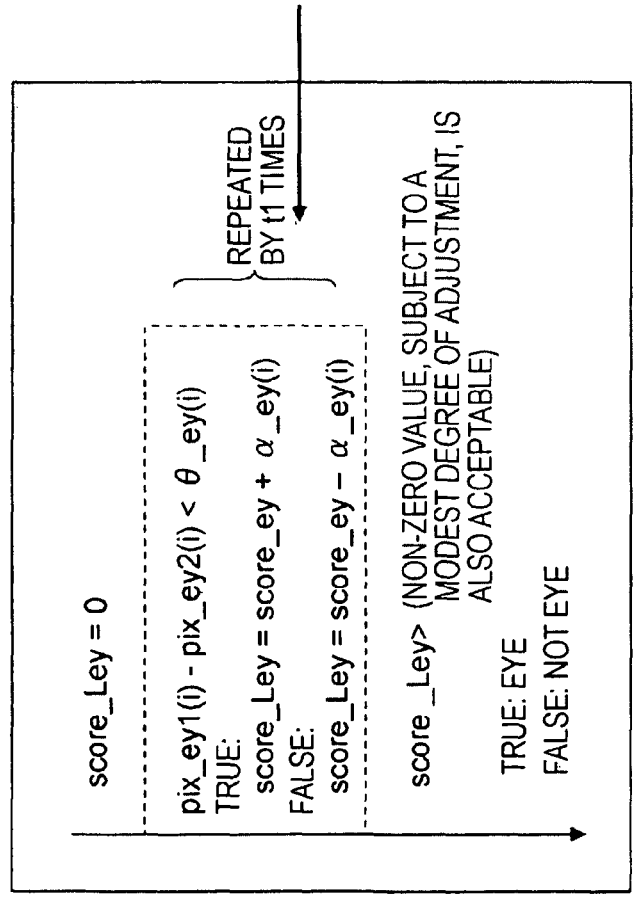

FIG. 15B
LEFT-EYE DICTIONARY pix_ey1(1), pix_ey2(1), $\theta$_ey(1), $\alpha$_ey(1)
pix_ey1(2), pix_ey2(2), $\theta$_ey(2), $\alpha$_ey(2)
pix_ey1(3), pix_ey2(3), $\theta$_ey(3), $\alpha$_ey(3)
pix_ey1(4), pix_ey2(4), $\theta$_ey(4), $\alpha$_ey(4)
pix_ey1(5), pix_ey2(5), $\theta$_ey(5), $\alpha$_ey(5)
.........
pix_ey1(t1), pix_ey2(t1), $\theta$_ey(t1), $\alpha$_ey(t1)

SEVERAL HUNDRED SETS

SMILING FACE DICTIONARY

SMILE SCORE MEASUREMENT
(AdaBoost strong classifier)

FIG. 21

|  | STATE A | STATE B | STATE C | STATE D |
|---|---|---|---|---|
| DETECTING LEFT EYE | FAILURE | SUCCESS | SUCCESS | SUCCESS |
| DETECTING RIGHT EYE | FAILURE | FAILURE | SUCCESS | SUCCESS |
| NORMALIZING FACE | SUCCESS/ FAILURE | SUCCESS | SUCCESS | FAILURE |
| SMILING FACE | DETECTED/ NOT DETECTED | DETECTED | DETECTED | DETECTED |
| PHOTOGRAPHING CONDITIONS | UNSATISFIED | UNSATISFIED | SATISFIED | UNSATISFIED |

FIG. 22

|  | STATE A | STATE B | STATE C | STATE D |
|---|---|---|---|---|
| DETECTING LEFT EYE | FAILURE | SUCCESS | SUCCESS | SUCCESS |
| DETECTING RIGHT EYE | FAILURE | FAILURE | SUCCESS | SUCCESS |
| NORMALIZING FACE | SUCCESS/ FAILURE | SUCCESS | SUCCESS | FAILURE |
| SMILING FACE | DETECTED/ NOT DETECTED | DETECTED | NOT DETECTED | DETECTED |
| NOTIFICATION CONDITIONS | UNSATISFIED | UNSATISFIED | SATISFIED | UNSATISFIED |

IMAGING APPARATUS, IMAGING METHOD AND COMPUTER PROGRAM FOR DETECTING A FACIAL EXPRESSION FROM A NORMALIZED FACE IMAGE

CROSS REFERENCES TO RELATED APPLICATIONS

The present invention contains subject matter related to Japanese Patent Application JP 2007-211199 filed in the Japanese Patent Office on Aug. 14, 2007, the entire contents of which are incorporated herein by reference.

BACKGROUND OF THE INVENTION

1. Field of the Invention

The present invention relates to an imaging apparatus, an imaging method and a computer program. Specifically, the present invention relates to an imaging apparatus that detects a predetermined feature from a face image of a person as a subject, acquires a normalized face image by normalizing a position of a face, an angle, and a size of the face in accordance with a position of the face feature, captures the image of the face of the subject at the moment a particular expression is detected from the normalized face image, and thus performs a photographing operation at the moment the face of the subject changes to a predetermined expression at a high automatic photographing accuracy level. More specifically, the present invention relates to an imaging apparatus automatically performing a photographing operation upon a predetermined image contained in the captured image of the subject satisfying a predetermined condition, wherein if the particular image failing to satisfy the predetermined condition is detected in the captured image, the imaging apparatus prompts the subject to satisfy the predetermined condition by notifying the subject that the photographing operation is performed in response to a satisfied predetermined condition.

2. Description of the Related Art

Imaging apparatuses capturing still images, such as a digital still camera, a digital camera recorder, etc. are currently in widespread use. For example, Japanese Unexamined Patent Application Publication No. 2005-56387 discloses an imaging apparatus that automatically photographs a subject if a smiling face image is detected in a captured image of the subject.

SUMMARY OF THE INVENTION

Imaging apparatuses of this type does not detect face at 100 percent accurate level, and face detection results often contain an error. If a non-face image contained in the captured image is detected as a face image, not only a smiling face determination is incorrectly performed based on the detected face image but also an erratic photographing operation is likely to be triggered.

The imaging apparatus of this type does not photograph until a smiling face image is detected from the captured image. With a long waiting time without a photographing operation being triggered, a person as a subject may start thinking of the possibility of an equipment failure of the imaging apparatus. Such a situation causes the subject to be ill at ease and makes it difficult for the subject to smile.

It is thus desirable to increase the accuracy level of an automatic photographing operation performed at the moment the face of a person as a subject changes to a particular expression. It is also desirable to prompt the subject to satisfy a predetermined condition if an unsatisfied predetermined condition prevents the automatic photographing operation from being started.

In accordance with one embodiment of the present invention, an image processing apparatus for processing an image, includes a face detector for detecting an image of a face contained in a captured image, based on image information of the captured image supplied from an imaging unit, a face feature detector for detecting a face feature contained in the face image, based on image information of the face image detected by the face detector, a normalizer for normalizing the face image detected by the face detector, based on a detected position of the face feature detected by the face feature detector and generating a normalized face image, and a face expression detector for detecting a face expression contained in the face image, based on image information of the normalized face image generated by the normalizer.

In accordance with the embodiment of the present invention, the face feature detector detects a predetermined face feature, such the eyes, the nose, etc., contained in the face image detected by the face detector. The normalizer normalizes the face image detected by the face detector in terms of at least one of the position of the face, the angle of the face and the size of the face, based on the detected position of the face feature detected by the face feature detector and generates the normalized face image.

The number of pixels in the normalized face image generated by the normalizer is smaller than the number of pixels of the face image prior to the normalization operation. More specifically, the face image needs a relatively large number of pixels (a higher resolution) so that the position of the face feature may be detected at a higher accuracy level. The normalized face image allowing a particular expression to be detected is acceptable if a general feature of the face is represented and no large number of pixels is thus required. By setting the number of pixels of the normalized face image to be smaller than the number of pixels of the face image, memory capacity is conserved, and a determination process of whether a face expression is a particular one or not is performed at high speed.

The face expression detector detects a particular expression based on the image information of the normalized face image. The particular expression may be a smiling face, a crying face, or the like. When a particular expression is detected, a photographing controller issues an instruction to perform a photographing operation. In this way, the photographing operation is automatically performed at the moment the person as the subject changes to the particular expression.

In accordance with embodiments of the present invention, the particular expression is detected using the image information of the normalized face image in which the position, the angle and the size of the face, etc. are normalized in accordance with the detected position of the face feature. The imaging apparatus thus provides a detection accuracy of the particular expression higher than an imaging apparatus that detects the particular expression using the image information of an unnormalized face image. The imaging apparatus of the embodiment of the present invention thus improves the accuracy level of the automatic photographing operation that is triggered at the moment the face expression of the subject changes to the particular one.

The image processing apparatus may further include a normalization determination unit for determining whether a normalization operation of the face image has been successfully completed, based on image information of the normalized face image generated by the normalizer. The photographing controller may instruct the imaging unit to perform the photographing operation if the normalization determination unit has determined that the normalization operation of the face image has been successfully completed and if the face expression detector has detected the particular expression.

The face detector may detect a face image in no fullface position. The face feature detector may detect a non-feature portion of the face as a face feature. In such a case, the normalized face image is one of a non-face image, a non-fullface image, and a tilted face image. In response to such images, the face expression detector may provide improper detection results. In such a case, the normalization determination unit determines that the normalization operation is a failure, and a photographing error is thus avoided.

The image processing apparatus may further include a notifier for notifying a subject that the photographing operation is performed upon the face of the subject changing to the particular face expression after a period that the particular expression is undetected by the face expression detector or after a period that the particular expression is undetected by the face expression detector with the normalization determination unit determining that the normalization operation of the face image has been successfully completed. The notifier can notify the subject as a user of the reason why the photographing operation is untriggered, and then prompts the subject to change the facial expression to the particular expression.

The present invention relates to the imaging processing apparatus that automatically photographs the subject if a particular image is detected in the captured image of the subject and if the state of the particular image satisfies the predetermined condition. The imaging processing apparatus includes the notifier that notifies the subject that the photographing operation is triggered upon the predetermined condition being satisfied after the state that the detected particular image has failed to satisfy the predetermined condition.

In accordance with embodiments of the present invention, the particular image is contained in the captured image. The automatic photographing operation is triggered if the state of the particular image satisfies the predetermined condition. For example, the automatic photographing operation is triggered if a face image, contained in the captured image, becomes a smiling face or a crying face. If the state of the particular image fails to satisfy the predetermined condition, the notifier notifies the subject that the automatic photographing operation is triggered if the predetermined condition is satisfied. For example, the subject is notified using light emission or an audio output.

The photographing operation is triggered if the state of the particular image satisfies the predetermined condition. The notification lets the subject know the reason why the automatic photographing operation remains untriggered, and prompts the subject to satisfy the predetermined condition.

In accordance with embodiments of the present invention, a predetermined face feature is detected, from the face image, the position, the angle and the size of the face are normalized in accordance with the detected position of the face feature to obtain the normalized face image, and the photographing operation is performed at the moment the particular face expression is detected from the normalized face image. The accuracy of the automatic photographing operation triggered at the moment the face of the subject changes to the particular expression is thus increased.

In accordance with embodiments of the present invention, the imaging processing apparatus performs the automatic photographing operation when the particular image contained in the captured image of the subject satisfies the particular condition. Even if the state of the detected particular image fails to satisfy the predetermined condition, the imaging apparatus notifies the subject that the automatic photographing operation is performed as soon as the predetermined condition is satisfied, and prompts the subject to satisfy the predetermined condition.

BRIEF DESCRIPTION OF THE DRAWINGS

FIGS. 15A and 15B illustrate a left-eye detection dictionary for use in the detection of the left eye, and measurement of a left-eye score with the left-eye detection dictionary;

FIG. 21 illustrates a determination example of a photographing condition;

FIG. 22 illustrates a determination example of the photographing condition; and

DESCRIPTION OF THE PREFERRED EMBODIMENTS

Figure 1:
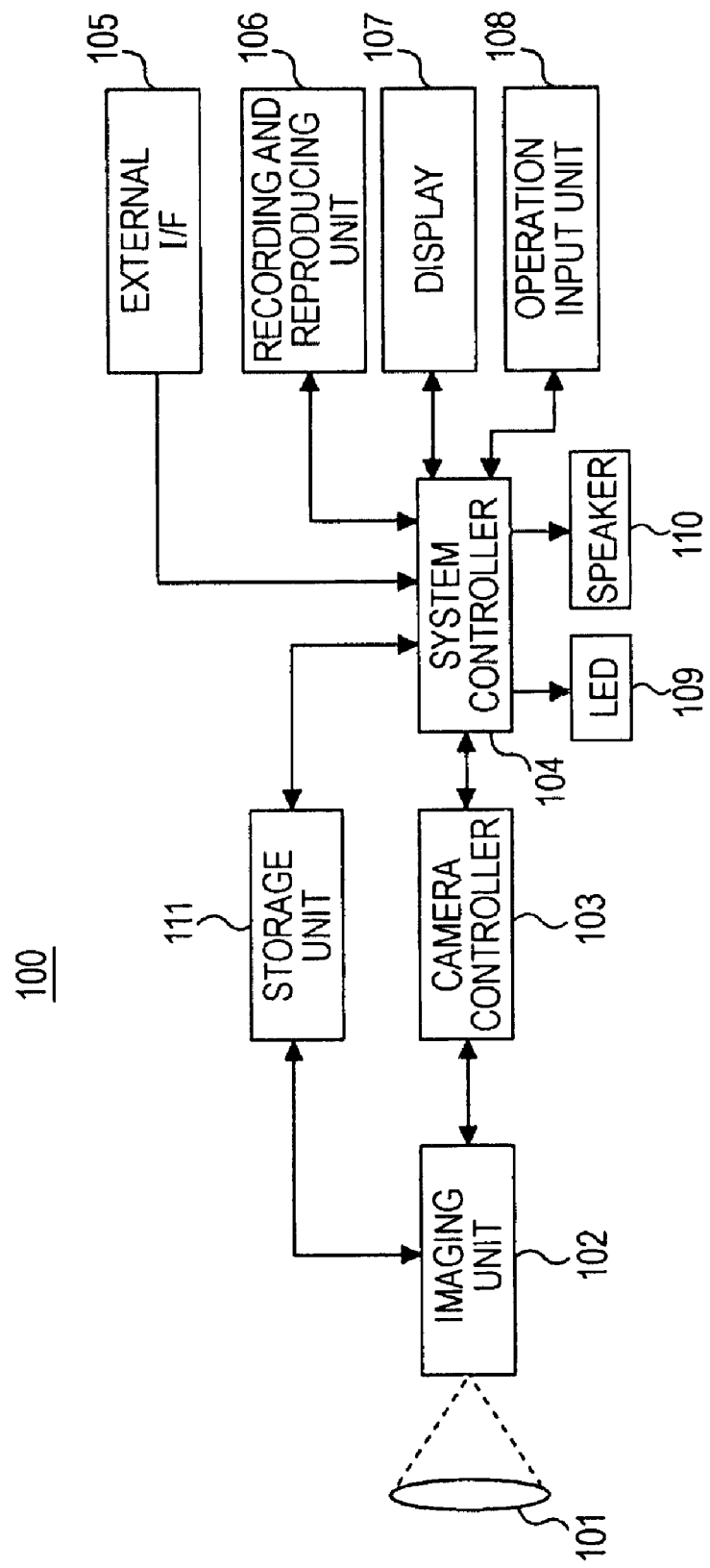
FIG. 1 is a block diagram illustrating a structure of a digital still camera in accordance with one embodiment of the present invention.

The embodiments of the present invention are described below with reference to the drawings. FIG. 1 illustrates a structure of a digital still camera 100 in accordance with one embodiment of the present invention.

The digital still camera 100 includes an imaging lens 101, an imaging unit 102, a camera controller 103, a system controller 104, an external interface 105, a recording and reproducing unit 106, a display 107, an operation input unit 108, a light-emitting diode (LED) 109, a speaker 110, and a storage unit 111.

The imaging unit 102 includes an imaging element (not shown) having an electronic shutter function, and a signal processor (not shown) that acquires image information (image data) responsive to a captured image by processing an output signal from the imaging element. The imaging lens 101 focuses an optical image of a subject on an imaging plane of the imaging element. The imaging element captures an image of the subject and the signal processor signal processes a captured signal. The imaging unit 102 thus obtains the image information responsive to the captured image. The camera controller 103 determines a shutter speed and exposure in response to the image information supplied from the imaging unit 102 via the storage unit 111, and controls the imaging unit 102.

The system controller 104 generally controls the digital still camera 100. The system controller 104 operates the operation input unit 108 in response to an user operation input, displays appropriate content on the display 107, stores image information onto the recording and reproducing unit 106, and communicates with an external computer and a network via the external interface 105. The system controller 104 also controls the camera controller 103 depending on the type of the user operation input, such as pressing of the shutter button. During a photographing operation, the system controller 104 displays an image captured by the imaging unit 102 onto the display 107. During a notification operation, the system controller 104 controls light emission of the LED 109 or audio outputting of the speaker 110.

The external interface 105 serves as an interface for connection with the external computer via a universal serial bus (USB) or with a network. The recording and reproducing unit 106 has a recording medium including mainly a flash memory removably loaded therewithin, records the image information on the recording medium or reads the image information from the recording medium. The display 107 includes a liquid-crystal panel, for example. The display 107 displays thereon a captured image, an image read from the recording medium by the recording and reproducing unit 106, and a variety of information to be shown to a user.

The operation input unit 108 is a key device including the shutter button exposed outside the casing of the digital still camera 100, and receives the user operation input. The storage unit 111 serves as a main storage unit for storing temporarily the image information responsive to the captured image output from the imaging unit 102. The storage unit 111 includes a dynamic random-access memory (DRAM). The image information is exchanged between the elements via the storage unit 111.

Figure 2:
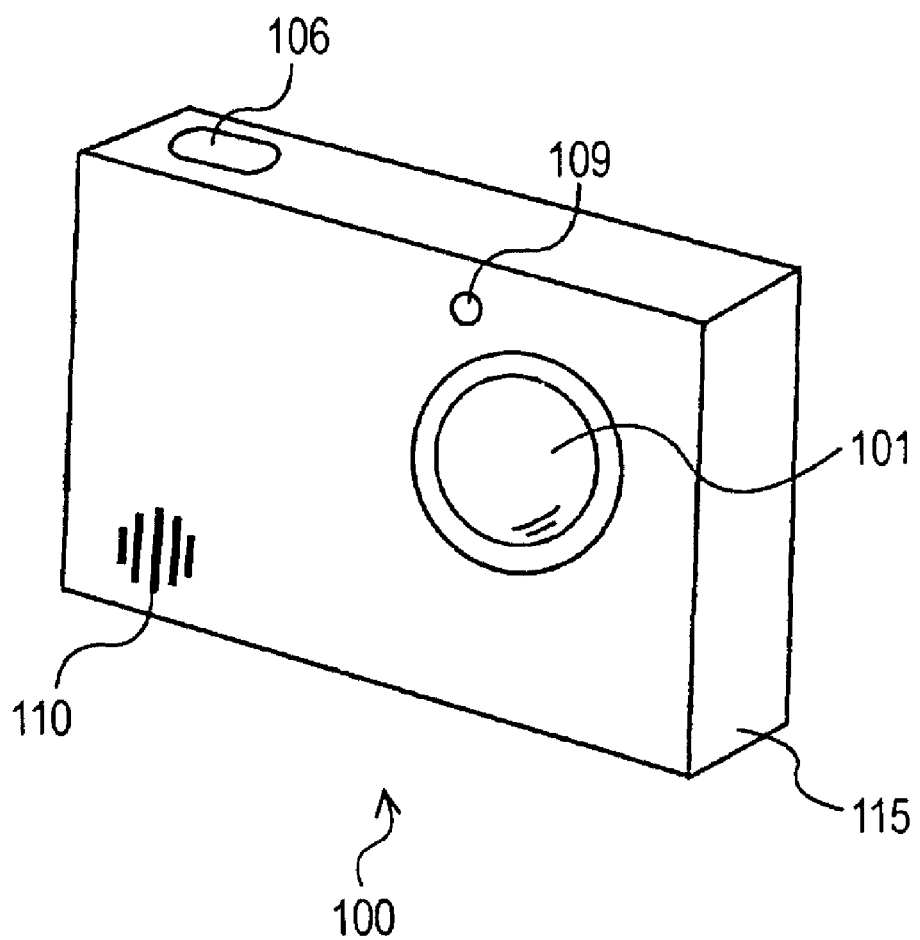
FIG. 2 is an external perspective view of the digital still camera in accordance with one embodiment of the present invention.

FIG. 2 is an external view of the digital still camera 100. Arranged on the front of a casing 115 of the digital still camera 100 are the LED 109 and the speaker 110 in addition to the imaging lens 101. A shutter button 116 is arranged on the top of the casing 115. A display 107 (not shown) and the operation input unit 108 (not shown) excluding the shutter button 116 are arranged on the back of the casing 115.

Figure 3:
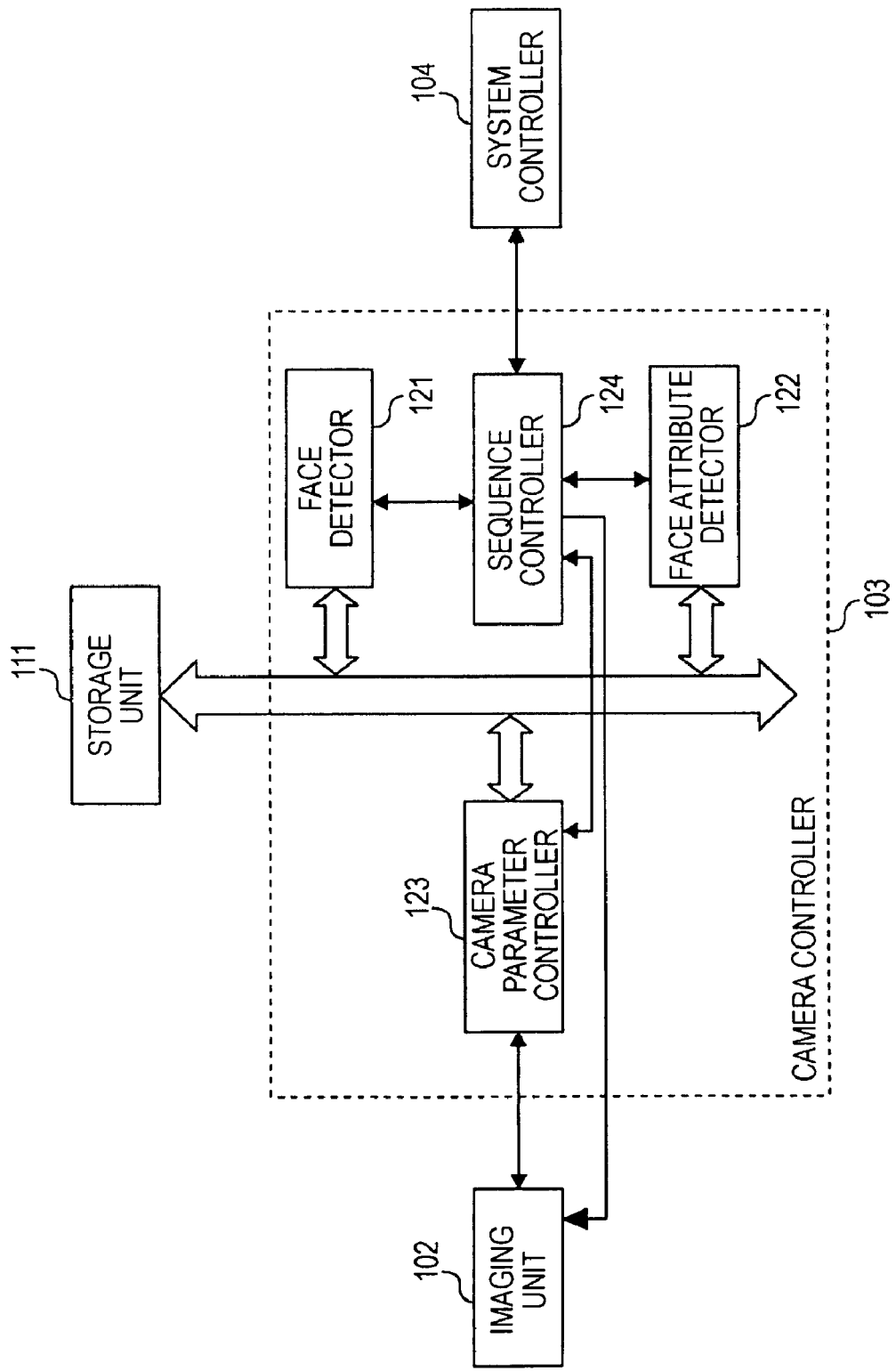
FIG. 3 is a block diagram illustrating a structure of a camera controller.

The camera controller 103 is described in detail below. FIG. 3 illustrates the camera controller 103. The camera controller 103 includes a face detector 121, a face attribute detector 122, a camera parameter controller 123, and a sequence controller 124.

In response to a trigger from the sequence controller 124, the face detector 121 detects a face image from the image information of a current captured image output from the imaging unit 102 and stored on the storage unit 111. Upon detecting the face image, the face detector 121 stores the image information corresponding to the face image onto the storage unit 111 and also supplies face detection information to the sequence controller 124. The detection process of the face detector 121 will be described in detail later.

In response to a trigger from the sequence controller 124, the face attribute detector 122 detects the eyes as a face feature from the image information of the face image detected by the face detector 121 and stored on the storage unit 111, and performs a normalization process on the face image in accordance with a detected position of the eyes. The face attribute detector 122 thus results in a normalized face image. The face attribute detector 122 supplies an eye score obtained in an eye detection process to the sequence controller 124, and supplies the image information responsive to the normalized face image obtained in the normalization process to the storage unit 111.

The face attribute detector 122 measures a normalization score for use in determination as to whether the normalization process has been successfully completed, based on the image information of the normalized face image stored on the storage unit 111, and supplies the normalization score to the sequence controller 124. Furthermore, the face attribute detector 122 measures a smiling face score for use in detection of a smiling face, based on the image information of the normalized face image stored on the storage unit 111, and supplies the smiling face score to the sequence controller 124. The detection process of the face attribute detector 122 will be described in detail later.

In response to a trigger from the sequence controller 124, the camera parameter controller 123 evaluates the image information of the current captured image output from the imaging unit 102 and stored on the storage unit 111, determines camera parameters such as a shutter speed, exposure, white balance, etc., and controls the imaging unit 102 in accordance with the camera parameters.

The sequence controller 124 starts up in response to a photograph standby instruction from the system controller 104, sends a startup instruction to the imaging unit 102, and maintains the imaging unit 102 at a photograph standby state to be ready for photographing. During the photograph standby state, the image information of the captured image of the subject acquired by the imaging unit 102 is supplied to the storage unit 111. The image information stored on the storage unit 111 is successively updated every field period (1/60 second). The sequence controller 124 controls the camera parameter controller 123 to calculate the camera parameter from the image information stored on the storage unit 111. The sequence controller 124 controls the face detector 121 to detect a face image from the image information stored on the storage unit 111.

Upon receiving the face detection information from the face detector 121, the sequence controller 124 controls the face attribute detector 122 to perform face attribute detection (including the detection of the eyes, the normalization process, the measurement of the normalization score, and the measurement of the smiling face score). At the moment the detection of the left and right eyes, the normalization process, and the detection of the smiling face are all successfully completed, the sequence controller 124 instructs a predetermined element, such as the system controller 104, to start photographing.

The user can set up a smiling face shutter mode by operating the operation input unit 108 in the digital still camera 100 of FIG. 1. When the user presses the shutter button 116 with the digital still camera 100 set in the smiling face shutter mode, the digital still camera 100 automatically performs a photographing operation on condition that the image of a smiling face is contained in the captured image of the subject.

Figure 4:
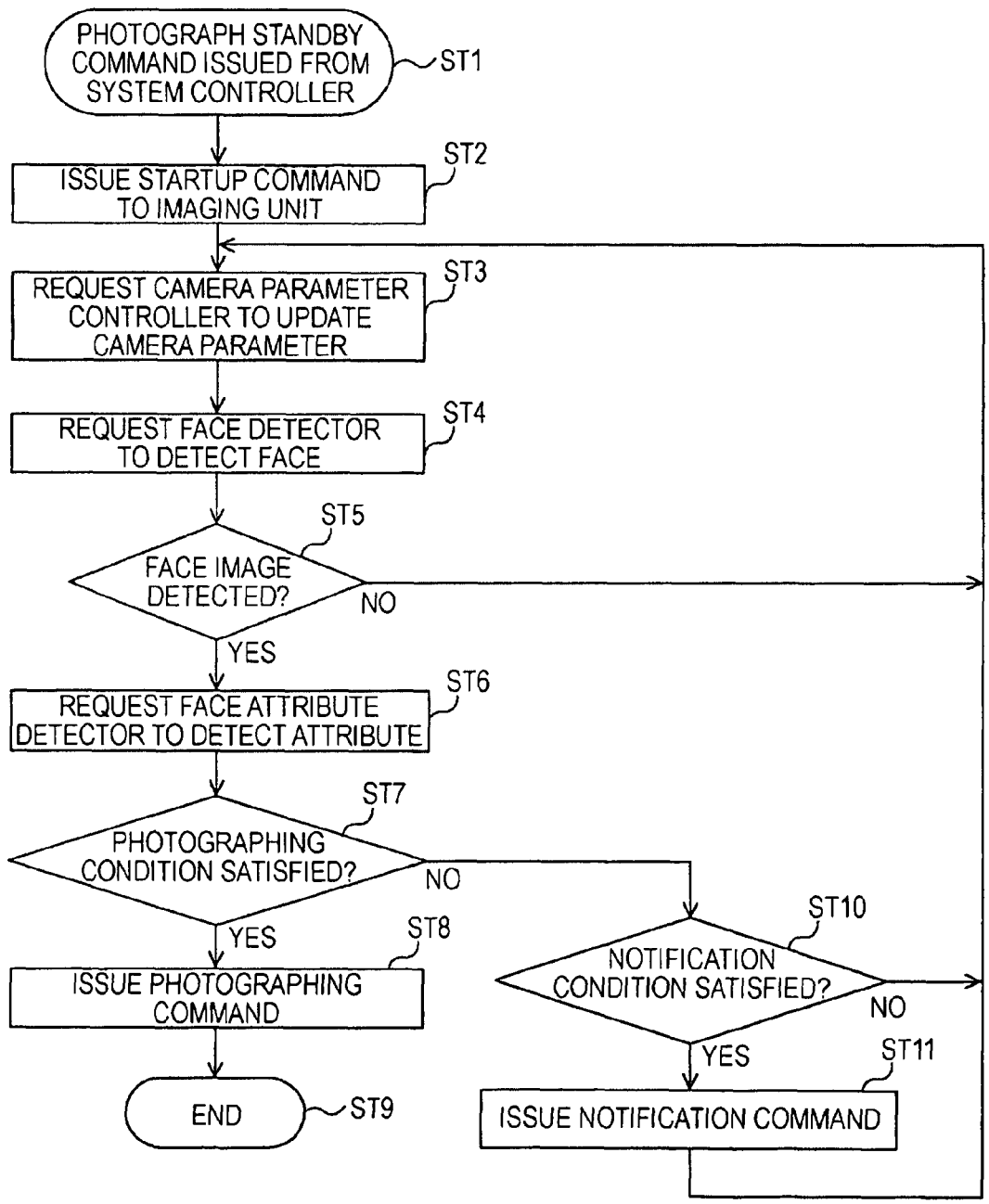
FIG. 4 is a flowchart illustrating a control sequence of a sequence controller with a shutter button pressed in a smiling face shutter mode.

A flowchart of FIG. 4 shows a control sequence of the sequence controller 124 performed when the shutter button 116 is pressed in the smiling face shutter mode.

In step ST1, the sequence controller 124 starts a control process in response to the photograph standby instruction from the system controller 104, and proceeds to step ST2. In step ST2, the sequence controller 124 sends a startup instruction to the imaging unit 102. Upon receiving the startup instruction, the imaging unit 102 shifts to the photograph standby state to be ready to start photographing. During the photograph standby state, the imaging unit 102 repeatedly captures the image of the subject. The image information of the captured image of the subject output from the imaging unit 102 is supplied to the storage unit 111. The image information stored on the storage unit 111 is successively updated every field period.

In step ST3, the sequence controller 124 requests the camera parameter controller 123 to update the camera parameter. Upon receiving the request, the camera parameter controller 123 evaluates the image information of the current captured image output from the imaging unit 102 and stored on the storage unit 111, determines the camera parameters such as the shutter speed, exposure, white balance, etc., and updates the camera parameters of the imaging unit 102.

Figure 5A:
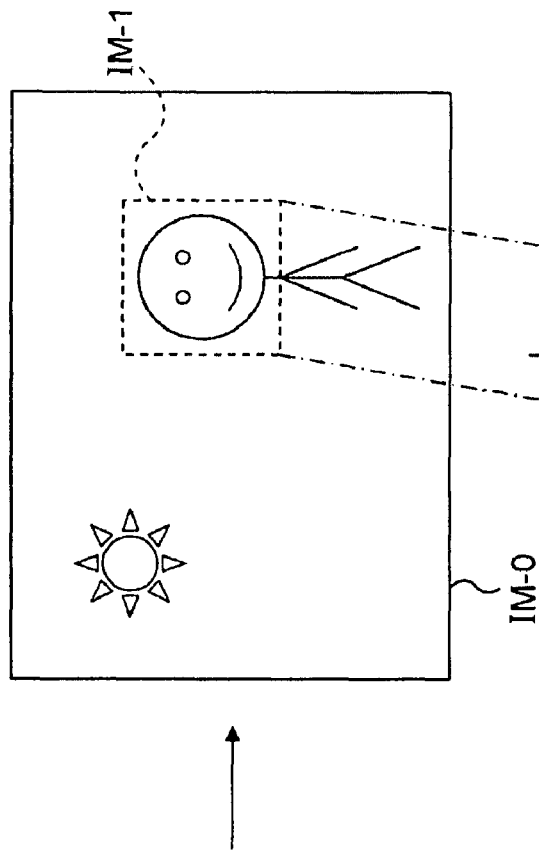
FIGS. 5A-5C illustrate a detection operation of a face image by a face detector.
Figure 5B:
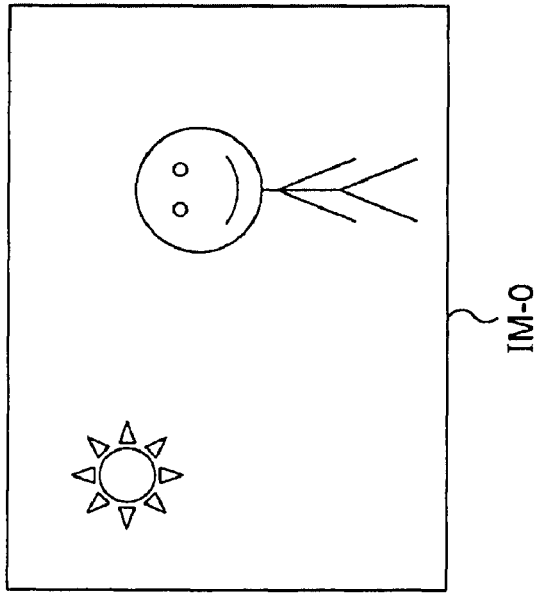

In step ST4, the sequence controller 124 requests the face detector 121 to detect a face image. The face detector 121 detects the face image from the image information of the current captured image output from the imaging unit 102 and stored on the storage unit 111. For example, if a captured image IM-0 on the storage unit 111 is the one as shown in FIG. 5A, the face detector 121 detects a face image IM-1 contained in the captured image IM-0 as enclosed in a broken-line box of FIG. 5B.

Figure 5C:
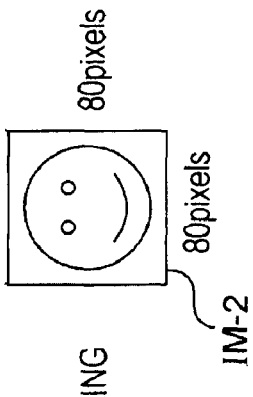

Upon detecting the face image, the face detector 121 normalizes the face image according to a predetermined size, for example, a horizontal size of 80 pixels by a vertical size of 80 pixels in this embodiment so that the face image is processed in the face attribute detector 122 as shown in FIG. 5C. The image information corresponding to the normalized face image IM-2 is stored onto the storage unit 111. Also upon detecting the face image, the face detector 121 sends face detection information (a face score, position information, size information, etc.) to the sequence controller 124.

The face image detection process of the face detector 121 is described below.

Figure 6:
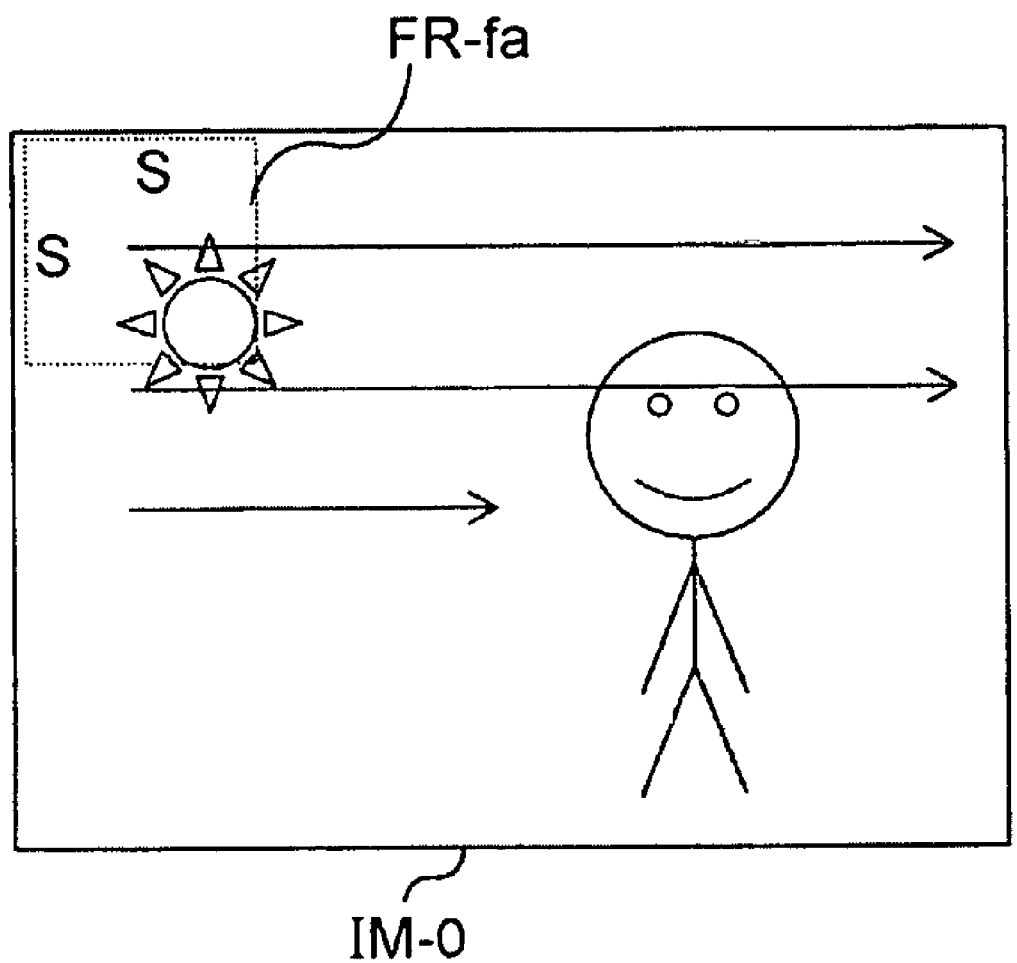
FIG. 6 illustrates a detection frame set on a captured image in order to detect a face image.

In the face image detection process, a detection frame FR-fa having a predetermined size, for example, a horizontal size of S pixels and a vertical size of S pixels, is set on the captured image IM-0 as shown in FIG. 6. In this embodiment, S is 80 pixels or larger. The detection frame FR-fa is shifted in a scan on the captured image IM-0 as shown by arrows with the position thereof shifted successively. A face score SCORE_fa of the image within the detection frame FR-fa at each position is measured using a face dictionary. Based on the face score SCORE_fa, the face detector 121 determines whether the image is a face image or not.

Figure 7A:
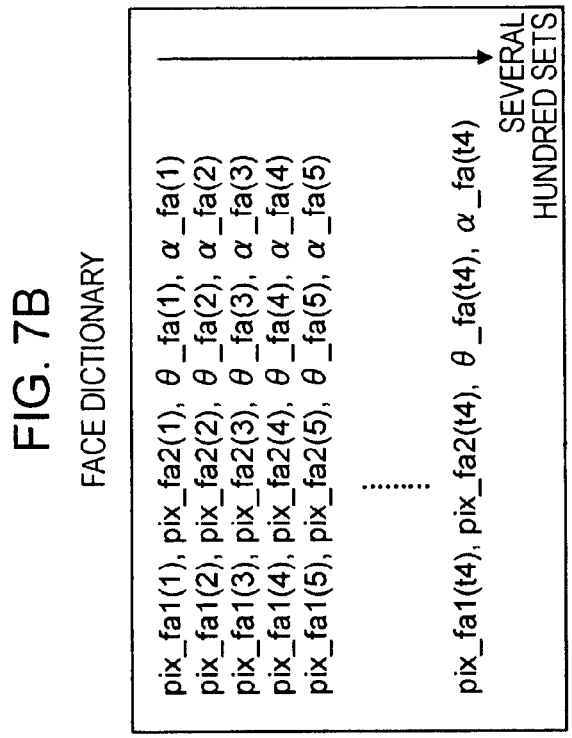
FIGS. 7A and 7B illustrate a face dictionary for use in face detection and measurement of a face score with the face dictionary used.
Figure 7B:
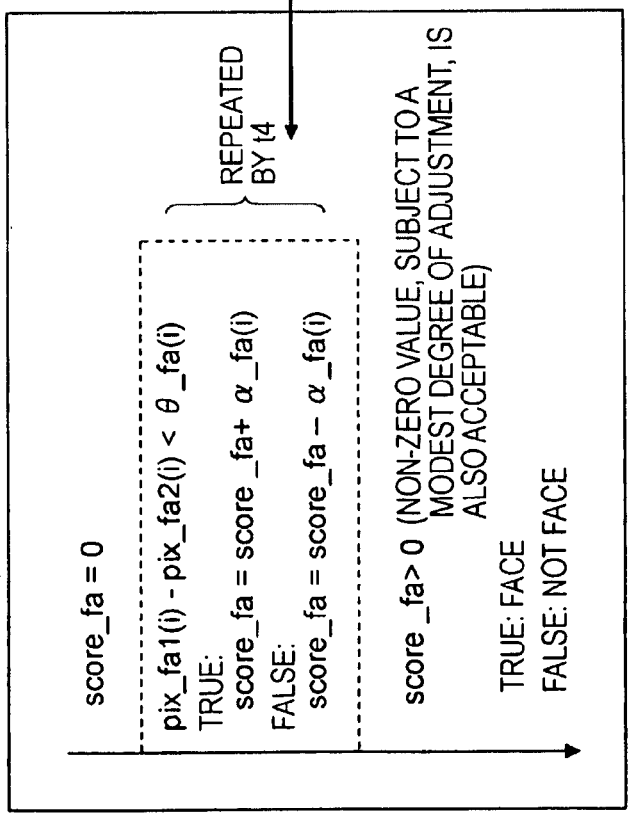
Figure 8:
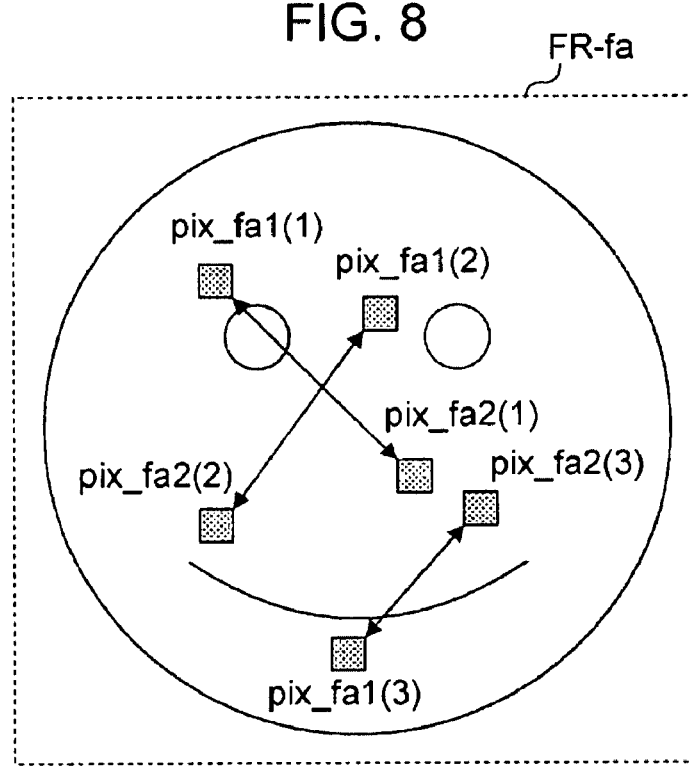
FIG. 8 illustrates a relationship between position information of each set of parameters in the face dictionary and the detection frame.

As shown in FIG. 7B, the face dictionary contains t4 sets of parameters, each set containing pix_fa1($i$), pix_fa2($i$), θ_fa(i) and α_fa(i). Here, pix_fa1($i$) and pix_fa2($i$) represent two positions in an image enclosed by the detection frame FR-fa as shown in FIG. 8. For simplicity, FIG. 8 shows only three pairs. θ_fa(i) represents a threshold value of a difference between a luminance value at pix_fa1($i$) and a luminance value at pix_fa2($i$). Further, α_fa(i) represents a weight added or subtracted depending on a comparison result of the threshold value θ_fa(i) with the difference between the luminance value at pix_fa1($i$) and the luminance value at pix_fa2($i$). The values of pix_fa1($i$), pix_fa2($i$), θ_fa(i) and α_fa(i), though not described in detail here, are acquired using a machine learning algorithm such as AdaBoost.

To measure the face score SCORE_fa, it is determined whether each set of pix_fa1($i$), pix_fa2($i$), θ_fa(i) and α_fa(i) in the face dictionary satisfies equation (1) as shown in FIG. 7A. If it is determined that each set satisfies equation (1), equation (2) is then calculated. If it is determined that each set fails to equation (1), equation (3) is then calculated. In equation (1), pix_fa1($i$) represents a luminance value at that position, and pix_fa2($i$) represents a luminance value at that position.

$$\text{pix\_fa1}(i) - \text{pix\_fa2}(i) < \theta\_\text{fa}(i) \tag{1}$$

$$\text{SCORE\_fa} = \text{SCORE\_fa} + \alpha\_\text{fa}(i) \tag{2}$$

$$\text{SCORE\_fa} = \text{SCORE\_fa} - \alpha\_\text{fa}(i) \tag{3}$$

A determination of whether the image surrounded by the detection frame FR-fa is a face image or not is performed based on thus described face score SCORE_fa. In the measurement of the face score SCORE_fa, h(i)=1 if equation (1) is satisfied, and h(i)=−1 if equation (1) is not satisfied. The measured face score SCORE_fa is written by equation (4):

$$\text{SCORE\_fa} = \sum_i h(i)\alpha\_\text{fa}(i) \tag{4}$$

If a face score SCORE_fa is greater than zero, it is determined that the image surrounded by the detection frame FR-fa is a face image. If a face score SCORE_fa is not greater than zero, it is determined that the face surrounded by the detection frame FR-fa is not a face image. The determination criterion is zero. Alternatively, the determination criterion may be set to be an adjusted value other than zero.

Figure 9:
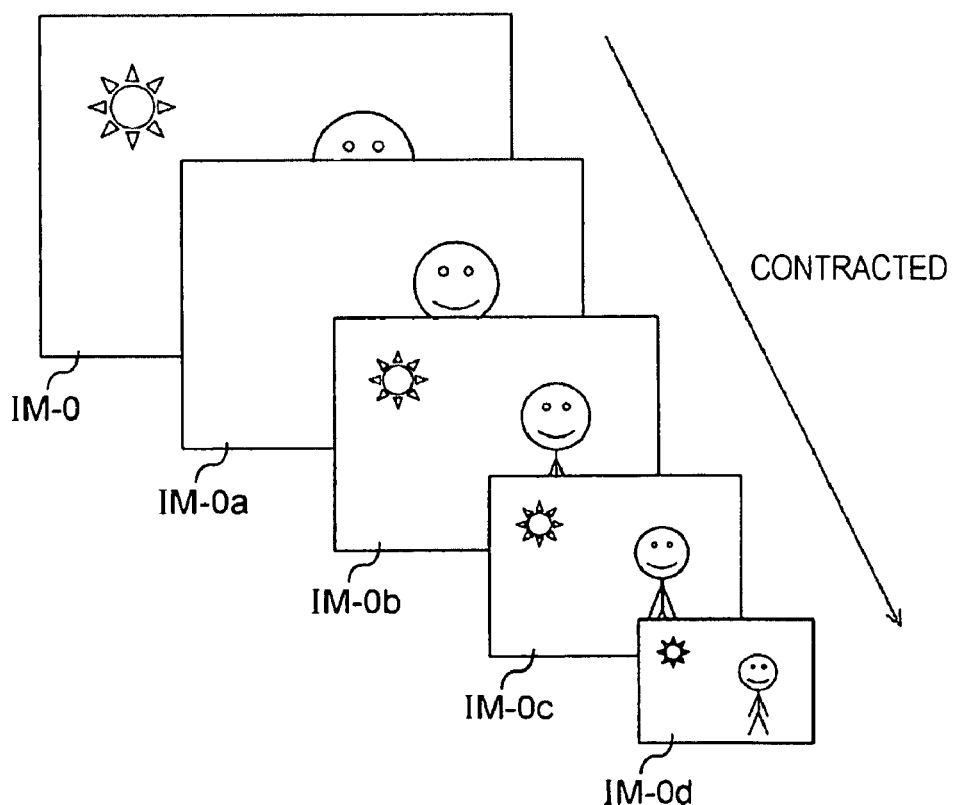
FIG. 9 illustrates the captured image for use in the face image detection, and contracted images thereof.

The face image contained in the captured image may have various sizes. As shown in FIG. 6, the detection frame FR-fa having a predetermined size is set on the captured image IM-0 to detect the face image. With this arrangement, only a face image matching the size of the detection frame FR-fa can be detected from the face images contained in the captured image IM-0. To allow a variety of face images contained in the captured image IM-0 to be detected, the face image detection process may be performed on not only the captured image IM-0 but also images IM-0$a$, IM-0$b$, ..., each contracted from the captured image IM-0 as shown in FIG. 9.

Figure 10:
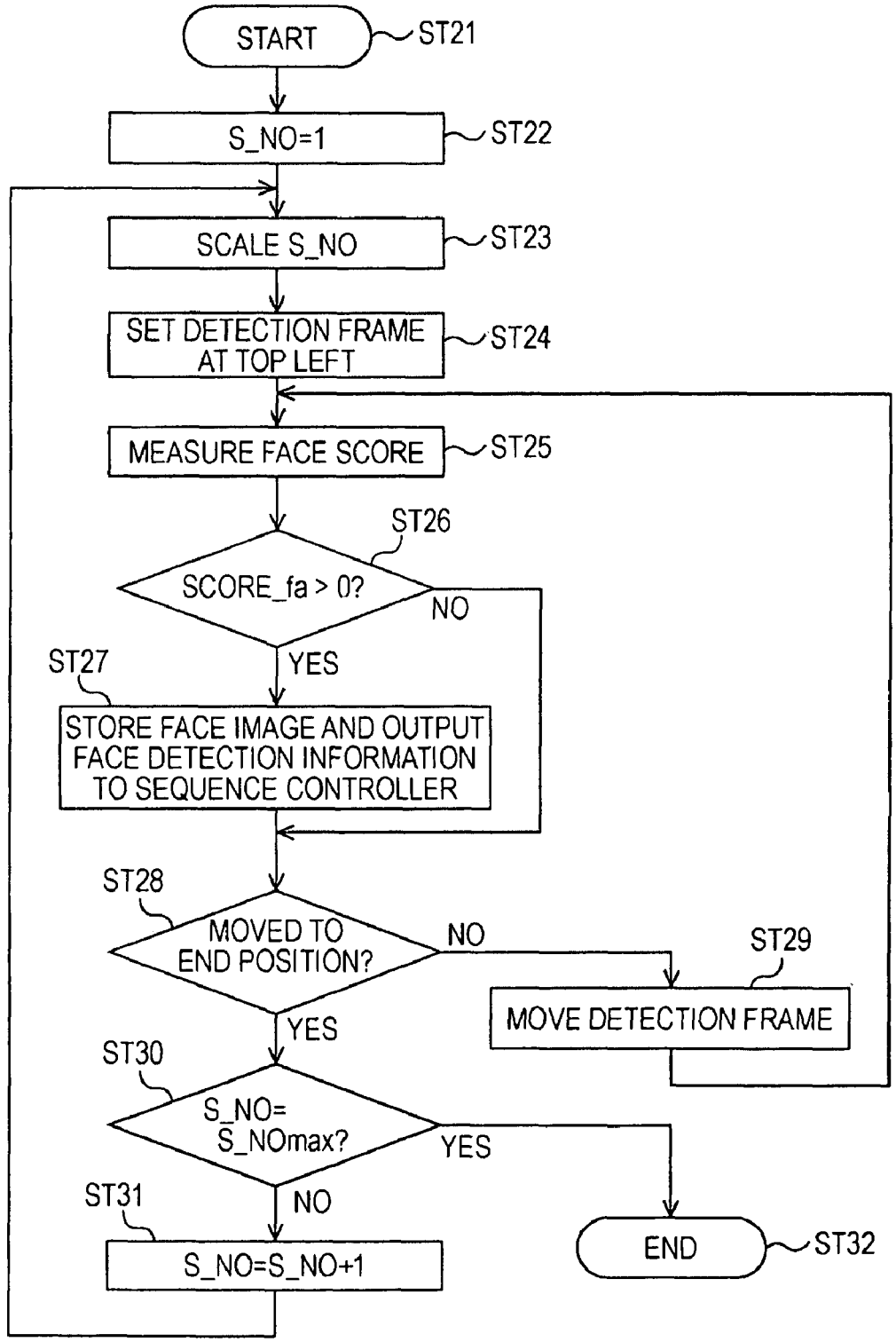
FIG. 10 is a flowchart illustrating a face image detection process of the face detector.

FIG. 10 is a flowchart illustrating the face image detection process of the face detector 121.

In step ST21, the face detector 121 starts the face image detection process and then proceeds to step ST22. In step ST22, the face detector 121 sets a contraction scale of the captured image IM-0 to S_NO 1. In step ST23, the face detector 121 reads the image information of the captured image IM-0 from the storage unit 111, and performs a scale contraction set by the contraction scale S_NO in order to generate the contracted image for face image detection. If S_NO=1, the contraction scale is 1. The contracted image for use in the face image detection is identical to the captured image IM-0. As the contraction scale S_NO increases, the contraction rate becomes small. A face image detected at a smaller contraction rate is a larger face image on the captured image IM-0. The size information and the position information, contained in the face detection information, are information of the captured image IM-0.

In step ST24, the face detector 121 sets a detection frame FR-fa at the top left corner of the image contracted in step ST23. In step ST25, the face detector 121 measures the face score SCORE_fa using the face dictionary as previously discussed.

In step ST26, the face detector 121 determines whether an image surrounded by the detection frame FR-fa is a face image, based on the face score SCORE_fa measured in step ST25. In this case, if face score SCORE_fa>0, the face detector 121 determines that the image is a face image. If the face score SCORE_fa>0 does not hold, the face detector 121 determines that the image is not a face image.

If it is determined that the image is a face image, the face detector 121 proceeds to step ST27. In step ST27, the face detector 121 stores the image surrounded by the detection frame FR-fa onto the storage unit 111 as a face image, and sends the face detection information of the face image (the face score, the position information, the size information, etc.) to the sequence controller 124. As previously discussed, the face detector 121 normalizes the detected face image of S pixels by S pixels to a size of 80 pixels by 80 pixels to process the detected face image in the face attribute detector 122, and then stores the normalized face image on the storage unit 111. Subsequent to step ST27, the face detector 121 proceeds to step ST28. If it is determined in step ST26 that the image is not a face image, the face detector 121 immediately proceeds to step ST28.

In step ST28, the face detector 121 determines whether the detection frame FR-fa reaches a final position. If the detection frame FR-fa has not yet reached the final position, the face detector 121 moves the detection frame FR-fa to a next position in step ST29. Processing returns to step ST25 to repeat the same process described above. The detection frame FR-fa at a given vertical position is shifted by one pixel at a time in a horizontal direction. When the shifting of the detection frame FR-fa in the horizontal direction is completed, the detection frame FR-fa is then shifted by one pixel to a new vertical position.

If it is determined in step ST28 that the detection frame FR-fa has reached the final position, the face detector 121 determines in step ST30 whether the contraction scale S_NO is a final contraction scale S_NOmax. If S_NO≠S_NOmax, the face detector 121 sets the contraction scale S_NO to a next scale in step ST31, and then returns to step ST23 to repeat the same process described above.

S_NO=S_NOmax in step ST30 means that the face image detection process has been performed at all contraction scales S_NO. The face detector 121 then completes the face image detection process in step ST32.

Returning to FIG. 4, the sequence controller 124 proceeds to step ST5 subsequent to step ST4. In step ST5, the sequence controller 124 determines whether a face image has been detected. If it is determined in step ST5 that no face image has been detected, the sequence controller 124 returns to step ST3 to repeat the same process described above. On the other hand, if it is determined in step ST5 that a face image has been determined, the sequence controller 124 proceeds to step ST6. In step ST6, the sequence controller 124 requests the face attribute detector 122 to detect a face attribute of each detected face image.

Figure 11:
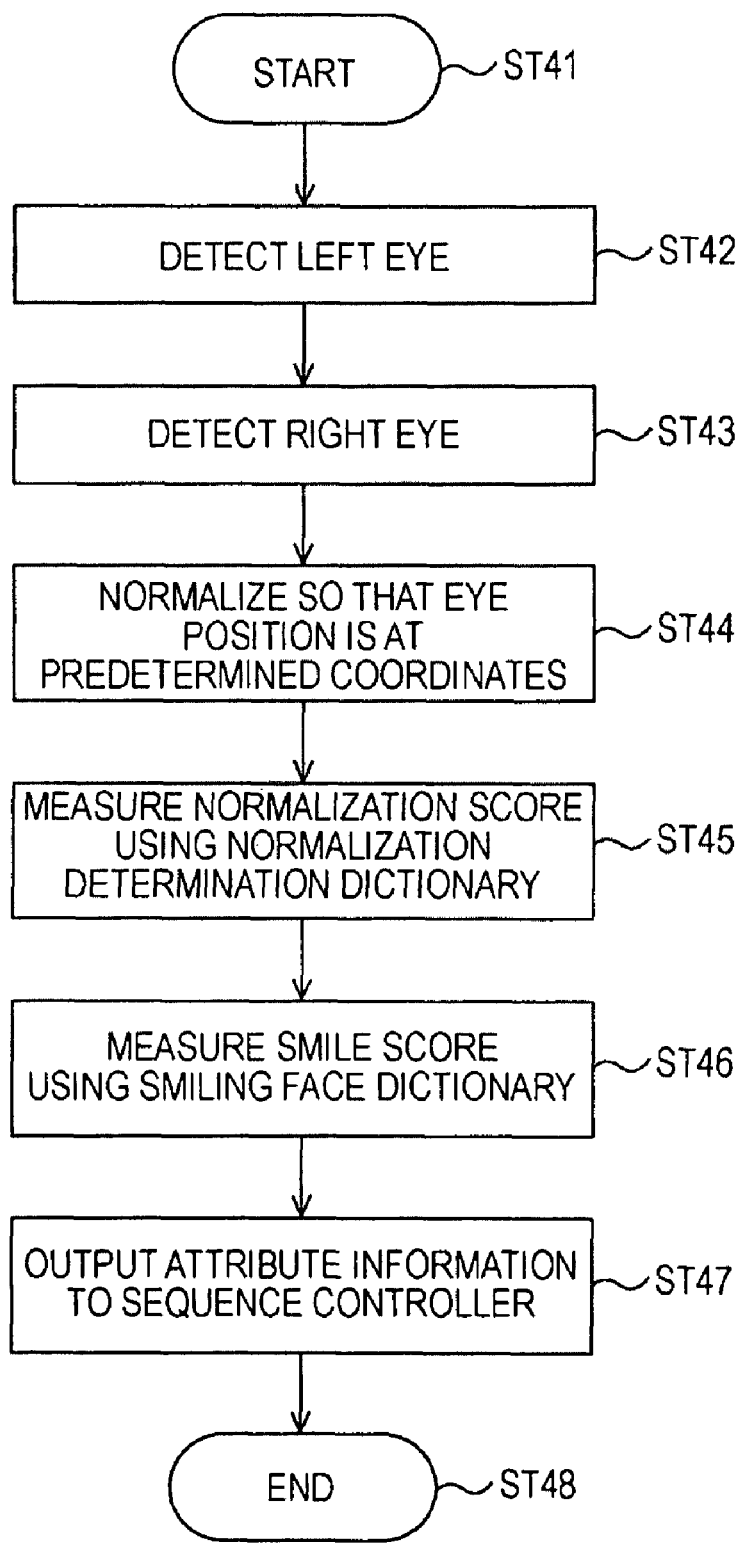
FIG. 11 is a flowchart illustrating a face attribute detection process of a face attribute detector.

FIG. 11 is a flowchart illustrating a face attribute detection process of the face attribute detector 122.

Figure 12A:
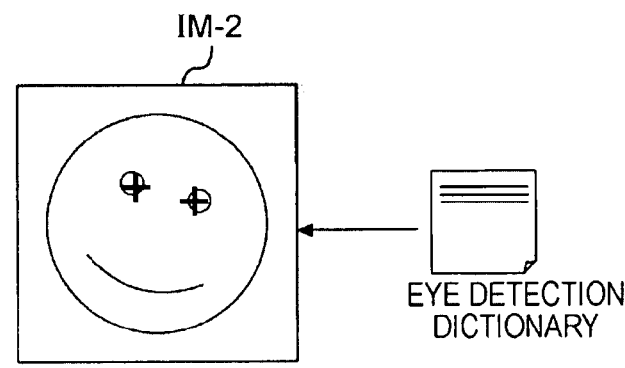
FIGS. 12A and 12B diagrammatically illustrate the flow of process of the face attribute detector.

In step ST41, the face attribute detector 122 starts the face attribute detection process. The face attribute detector 122 detects the left eye in step ST42 and the right eye in step ST43. In the eye detection process, the face attribute detector 122 detects the eyes as a face feature using the eye detection dictionary, based on the image information of a face image IM-2 normalized to the size of 80 pixels by 80 pixels and stored on the storage unit 111 as illustrated in FIG. 12A.

The left eye detection process is described. The face attribute detector 122 sets up a left-eye detection area AR-Ley on the face image IM-2 of FIG. 13. Top left coordinates of the left-eye detection area AR-Ley are (LEFT_LEFT, LEFT_TOP), and bottom right coordinates are (LEFT_RIGHT, LEFT_BOTTOM).

To detect the left eye, the face attribute detector 122 sets up a detection frame FR-ey on the face image IM-2. In accordance with the present embodiment, the detection frame FR-ey has a predetermined size of a horizontal dimension of 24 pixels and a vertical dimension of 24 pixels. The left-eye detection area AR-Ley represents an area in which the center of the detection frame FR-ey is permitted to move.

Figure 13:
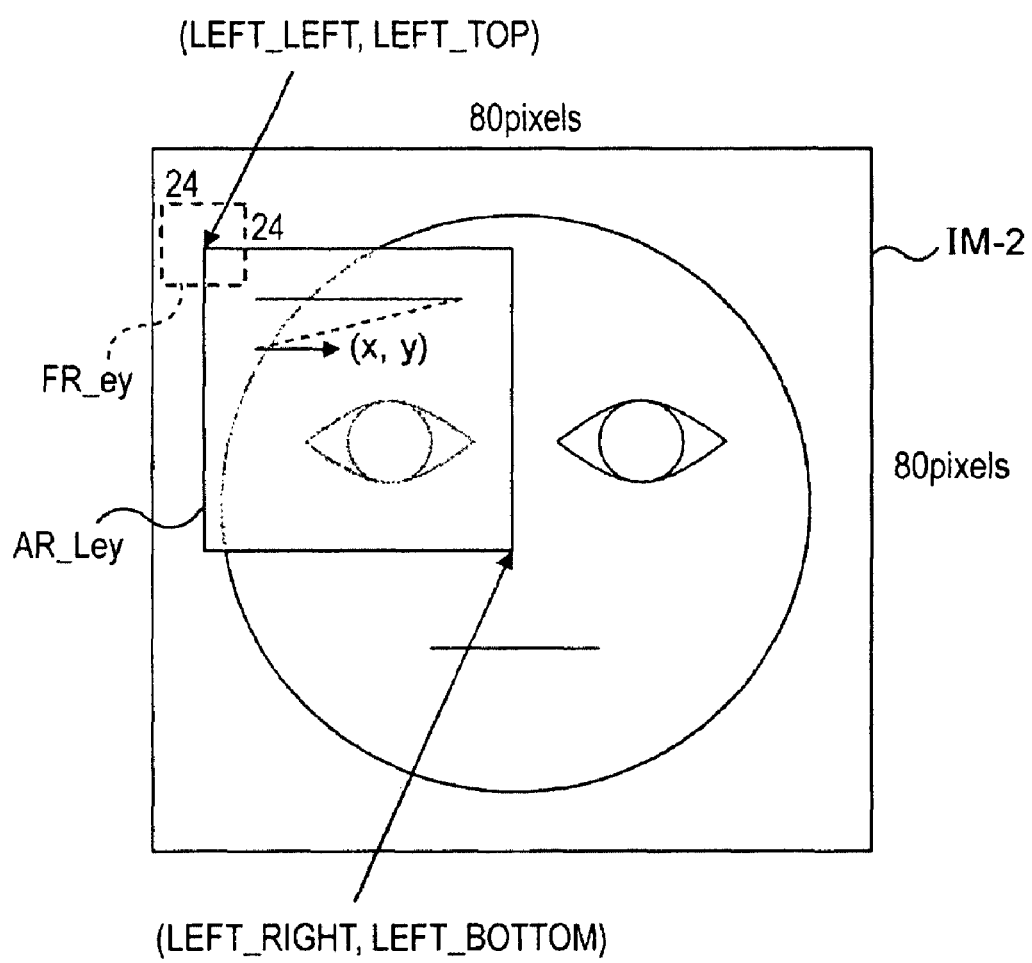
FIG. 13 illustrates a left-eye detection area set in a face image for detecting the left eye, and a detection frame moving within the left-eye detection area.

As represented by arrow-headed lines in FIG. 13, the detection frame FR-ey is moved with the position thereof being successively shifted within the left-eye detection area AR-Ley. The face attribute detector 122 measures a left-eye score SCORE_Ley on the image surrounded by the detection frame FR-ey at each position, using the left-eye detection dictionary. The face attribute detector 122 outputs a maximum value of the left-eye score SCORE_Ley and position information regarding a position of the detection frame FR-ey where the maximum value of the left-eye score SCORE_Ley has been obtained.

Figure 14:
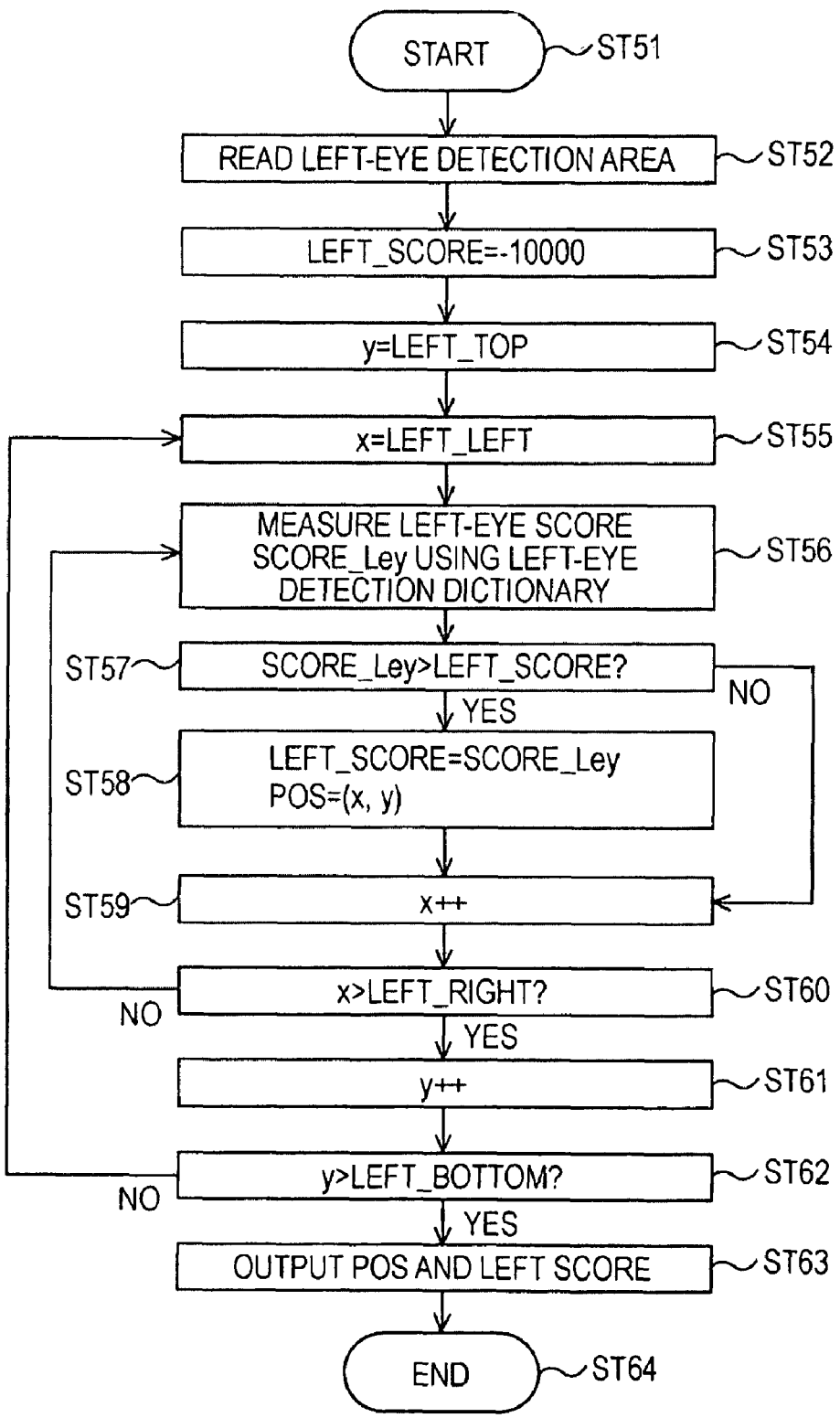
FIG. 14 is a flowchart illustrating a left-eye detection process of the face attribute detector.

FIG. 14 is a flowchart illustrating the left-eye detection process. The face attribute detector 122 starts the left-eye detection process in step ST51 and then proceeds to step ST52. In step ST52, the face attribute detector 122 reads from the storage unit 111 the image information of the left-eye detection area AR-Ley to be used in the left-eye detection process.

In step ST53, the face attribute detector 122 sets up LEFT_SCORE to a large negative number, for example, −10000 in the present embodiment. In steps ST54 and ST55, the face attribute detector 122 sets the center position (x,y,z) of the detection frame FR-ey at the top left corner of the left-eye detection area AR-Ley, i.e., y=LEFT_TOP and x=LEFT_LEFT.

In step ST56, the face attribute detector 122 measures the left-eye score SCORE_Ley of the image surrounded by the detection frame FR-ey using the left-eye detection dictionary. In step ST57, the face attribute detector 122 determines whether the left-eye score SCORE_Ley is larger than LEFT_SCORE. If SCORE_Ley>LEFT_SCORE, the face attribute detector 122 proceeds to step ST58. In step ST58, the face attribute detector 122 sets LEFT_SCORE=SCORE_Ley and POS=(x,y).

The face attribute detector 122 proceeds to step ST59 subsequent to step ST58. If it is determined in step ST57 that the relationship of SCORE_Ley>LEFT_SCORE fails to hold, the face attribute detector 122 immediately proceeds to step ST59. In step ST59, the face attribute detector 122 increments x. In step ST60, the face attribute detector 122 determines whether x is larger than LEFT_RIGHT. The determination that x is larger than LEFT_RIGHT means that the center position (x,y) of the detection frame FR-ey has moved rightward and reached the right end of the left-eye detection area AR-Ley. If the relationship of x>LEFT_RIGHT fails to hold, the face attribute detector 122 returns to step ST56 to repeat the same process described above. If the relationship of x>LEFT_RIGHT holds, the face attribute detector 122 increments y in step ST61.

In step ST62, the face attribute detector 122 determines whether y is larger than LEFT_BOTTOM. The determination that y is larger than LEFT_BOTTOM means that the detection frame FR-ey has moved downward and reached the bottom end of the left-eye detection area AR-Ley. If the relationship of y>LEFT_BOTTOM fails to hold, the face attribute detector 122 returns to step ST55 to repeat the same process described above.

The determination in step ST62 that y is larger than LEFT_BOTTOM means that the movement of the detection frame FR-ey within the left-eye detection area AR-Ley has been completed. The face attribute detector 122 proceeds to step ST63. In step ST63, the face attribute detector 122 outputs a maximum value LEFT_SCORE of the left-eye score SCORE_Ley and position information POS at which the maximum value LEFT_SCORE of the left-eye score SCORE_Ley has been obtained. In step ST64 subsequent to step ST63, the face attribute detector 122 completes the left-eye detection process.

A measurement process of the left-eye score SCORE_Ley in step ST56 is described below.

Figure 16:
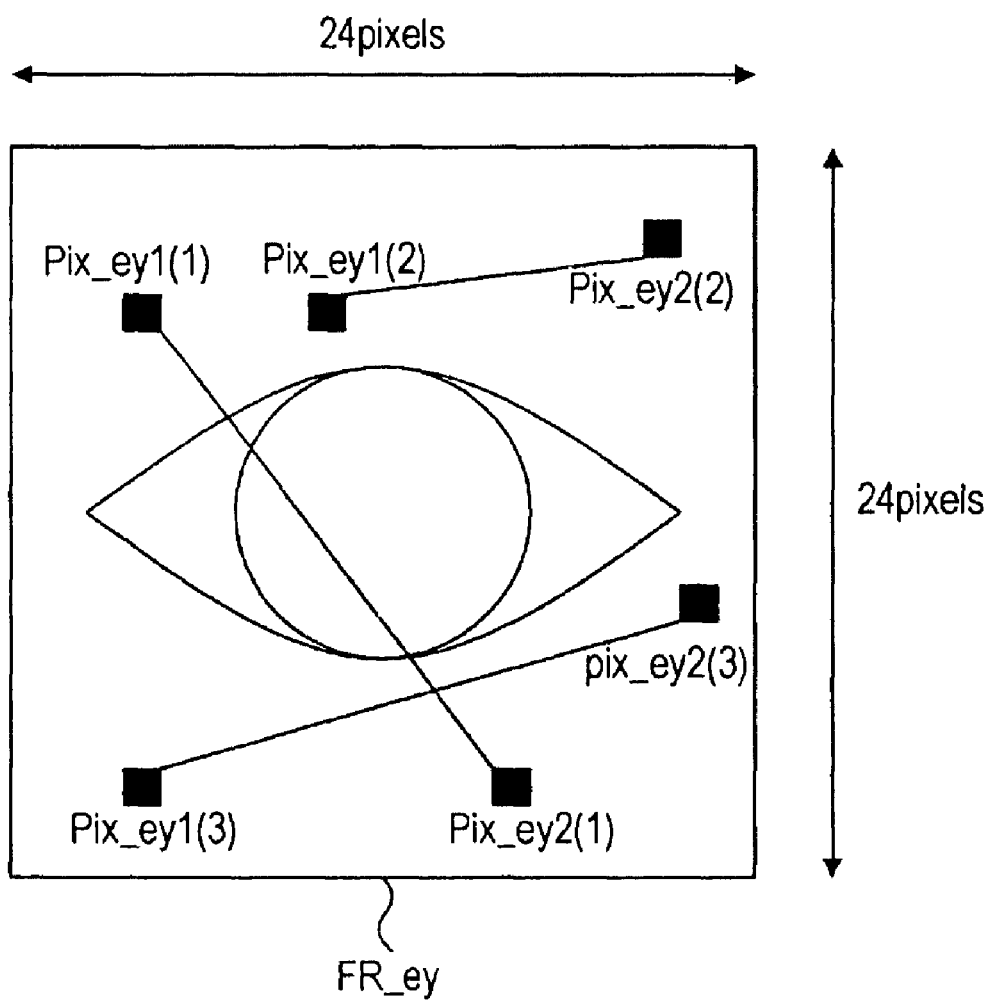
FIG. 16 illustrates a relationship between position information of each set of parameters in the left-eye detection dictionary and the detection frame.

As shown in FIG. 15B, the left-eye detection dictionary contains t1 sets (sets of several hundreds), each set containing pix_ey1($i$), pix_ey2($i$), θ_ey(i) and α_ey(i). As shown in FIG. 16, pix_ey1($i$) and pix_ey2($i$) represent two positions in the image surrounded by the detection frame FR-ey. FIG. 16 illustrates only three sets for simplicity. θ_ey(i) represents a threshold value of a difference between a luminance value at pix_ey1($i$) and a luminance value at pix_ey2($i$). Further, α_ey(i) represents a weight added or subtracted depending on a comparison result of the threshold value θ_ey(i) with the difference between the luminance value at pix_ey1($i$) and the luminance value at pix_ey2($i$). The values of pix_ey1($i$), pix_ey2($i$), θ_ey(i) and α_ey(i), though not described in detail here, are acquired using a machine learning algorithm such as AdaBoost.

To measure the left-eye score SCORE_Ley, it is determined whether each set of pix_ey1($i$), pix_ey2($i$), θ_ey(i) and α_ey(i) in the face dictionary satisfies equation (5) as shown in FIG. 15A. If it is determined that each set satisfies equation (5), equation (6) is then calculated. If it is determined that each set fails to equation (5), equation (7) is then calculated. In equation (5), pix_ey1($i$) represents a luminance value at that position, and pix_ey2($i$) represents a luminance value at that position.

$$\text{pix\_ey1}(i) - \text{pix\_ey2}(i) < \theta\_\text{ey}(i) \quad (5)$$

$$\text{SCORE\_Ley} = \text{SCORE\_Ley} + \alpha\_\text{ey}(i) \quad (6)$$

$$\text{SCORE\_Ley} = \text{SCORE\_Ley} - \alpha\_\text{ey}(i) \quad (7)$$

Figure 17:
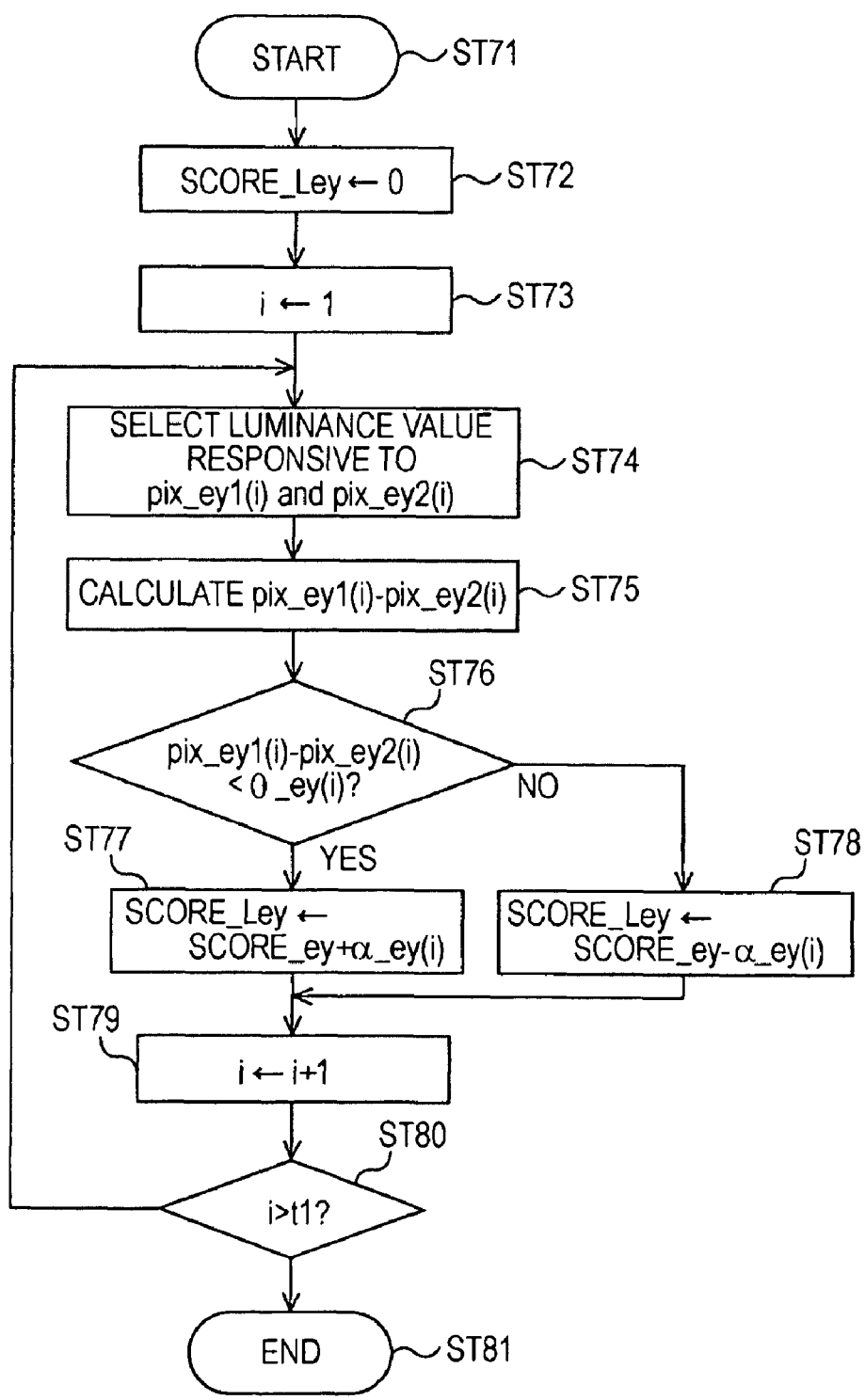
FIG. 17 is a flowchart illustrating a score measurement process with the dictionary used.

FIG. 17 is a flowchart illustrating a measurement process of the left-eye score SCORE_Ley. The face attribute detector 122 starts a score measurement process in step ST71 and then proceeds to step ST72. In step ST72, the face attribute detector 122 sets the left-eye score SCORE_Ley to zero. In step ST73, the face attribute detector 122 sets i to 1.

The face attribute detector 122 selects luminance values for pix_ey1($i$) and pix_ey2($i$) in step ST74 and subtracts the luminance at pix_ey2($i$) from the luminance at pix_ey1($i$) in step ST75. In step ST76, the face attribute detector 122 determines whether the difference between pix_ey1($i$) and pix_ey2($i$) is smaller than θ_ey(i) (as represented in equation (5)).

If the relationship of pix_ey1($i$)−pix_ey2($i$)<θ_ey(i) holds, the face attribute detector 122 adds a weight α_ey(i) to the left-eye score SCORE_Ley in step ST77 (as represented in equation (6)). If the relationship of pix_ey1($i$)−pix_ey2($i$)<θ_ey(i) fails to hold, the face attribute detector 122 subtracts a weight α_ey(i) from the left-eye score SCORE_Ley in step ST78 (as represented in equation (7)).

The face attribute detector 122 proceeds to step ST79 subsequent to step ST77 or subsequent to step ST78. In step ST79, the face attribute detector 122 increments i. In step ST80, the face attribute detector 122 determines whether i is greater than t1. The determination in step ST80 that i is greater than t1 means that processing of t1 sets in the left-eye detection dictionary has been completed. If the relationship of i>t1 fails to hold, processing returns to step ST74 to repeat the same process described above. If the relationship of i>ti holds, the face attribute detector 122 completes the score measurement process in step ST81.

The right-eye detection process (not described in detail herein) is also performed in a manner similar to the left-eye detection process discussed above. A maximum value LEFT_SCORE of the right-eye score SCORE_Rey and position information POS of the detection frame FR_ey providing the maximum value LEFT_SCORE of the right-eye score SCORE_Rey are thus output.

Figure 12B:
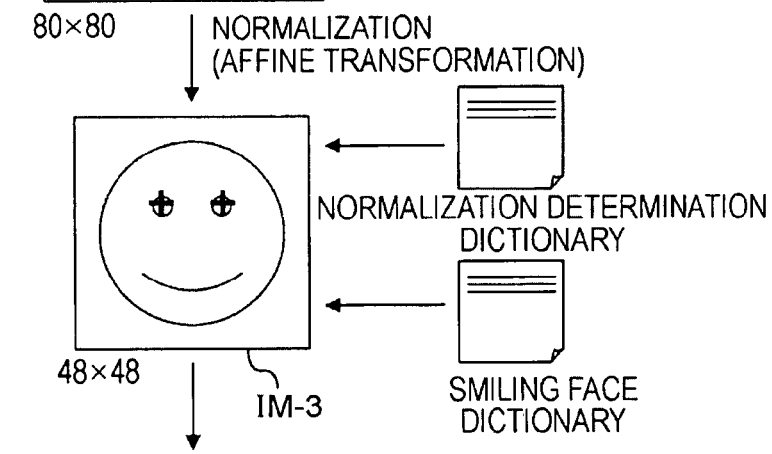

Returning to FIG. 11, the face attribute detector 122 proceeds to step ST44 subsequent to step ST43. In step ST44, the face attribute detector 122 performs a normalization process (affine transform) so that the positions of the left and right eyes have predetermined coordinates. As shown in FIG. 12B, the face attribute detector 122 thus generates a normalized face image IM-3 having a predetermined size as shown in FIG. 12B, i.e., of a horizontal dimension of 48 pixels and a vertical dimension of 48 pixels in this embodiment. After the normalization process is performed so that the left and right eyes have predetermined coordinates, the position, the angle and the size of the face are all normalized in the normalized face image IM-3.

If the maximum value LEFT_SCORE of the left-eye score SCORE_Ley output in the left-eye detection process in step ST42 is greater than zero, the face attribute detector 122 determines that the left eye has been successfully detected, and thus determines that POS represents the position of the left eye. Similarly, if the maximum value LEFT_SCORE of the right-eye score SCORE_Rey output in the right-eye detection process in step ST43 is greater than zero, the face attribute detector 122 determines that the right eye has been successfully detected, and thus determines that POS represents the position of the right eye.

If the left and right eyes have been successfully detected, the face attribute detector 122 performs the affine transform using the positions of the left and right eyes. Even if the detection of the left and right eyes has not been successfully completed in accordance with the present embodiment, the face attribute detector 122 performs the affine transform on the premise that the left and right eyes are detected at predetermined positions.

The number of pixels of the normalized face image IM-3 (48 pixels by 48 pixels) normalized based on the left and right eyes is set to be smaller than the number of pixels of the above-described normalized face image IM-2 (80 pixels by 80 pixels). This has been so set because of the following reason. The normalized face image IM-2 needs to have a predetermined number of pixels or more (predetermined resolution) to detect accurately the eyes. On the other hand, the normalized face image IM-3 is used to detect a general feature expanding over the entire face (the normalization determination score and smiling score), and pixels of a small number still satisfactorily work. By reducing the number of pixels in the normalized face image IM-3, the memory capacity is conserved. Feature detection is simply performed at high speed.

In step ST45, the face attribute detector 122 measures a normalization score SCORE_no using the normalization determination dictionary as shown in FIG. 12B. The normalization score SCORE_no is referenced to determine whether the normalization process has been successfully completed. Examples of normalized face image IM-3 failed in the normalization include a normalized face image IM-3 resulting from a non-face image, a normalized face image IM-3 full-face but inclined, and a normalized face image IM-3 looking away. The normalized face image IM-3 not correctly normalized results in an inappropriate or unknown measured value of a smile score SCORE_sm to be discussed later.

A measurement process of the normalization score SCORE_no is described below.

Figure 18:
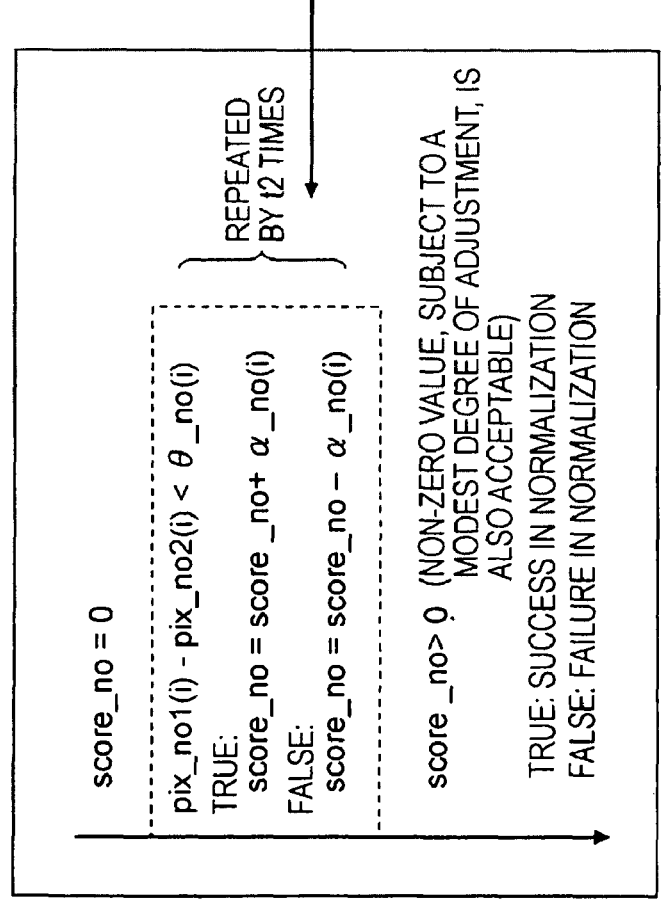
FIGS. 18A and 18B illustrate a normalization determination dictionary and measurement of normalization score with the normalization determination dictionary used.
Figure 19:
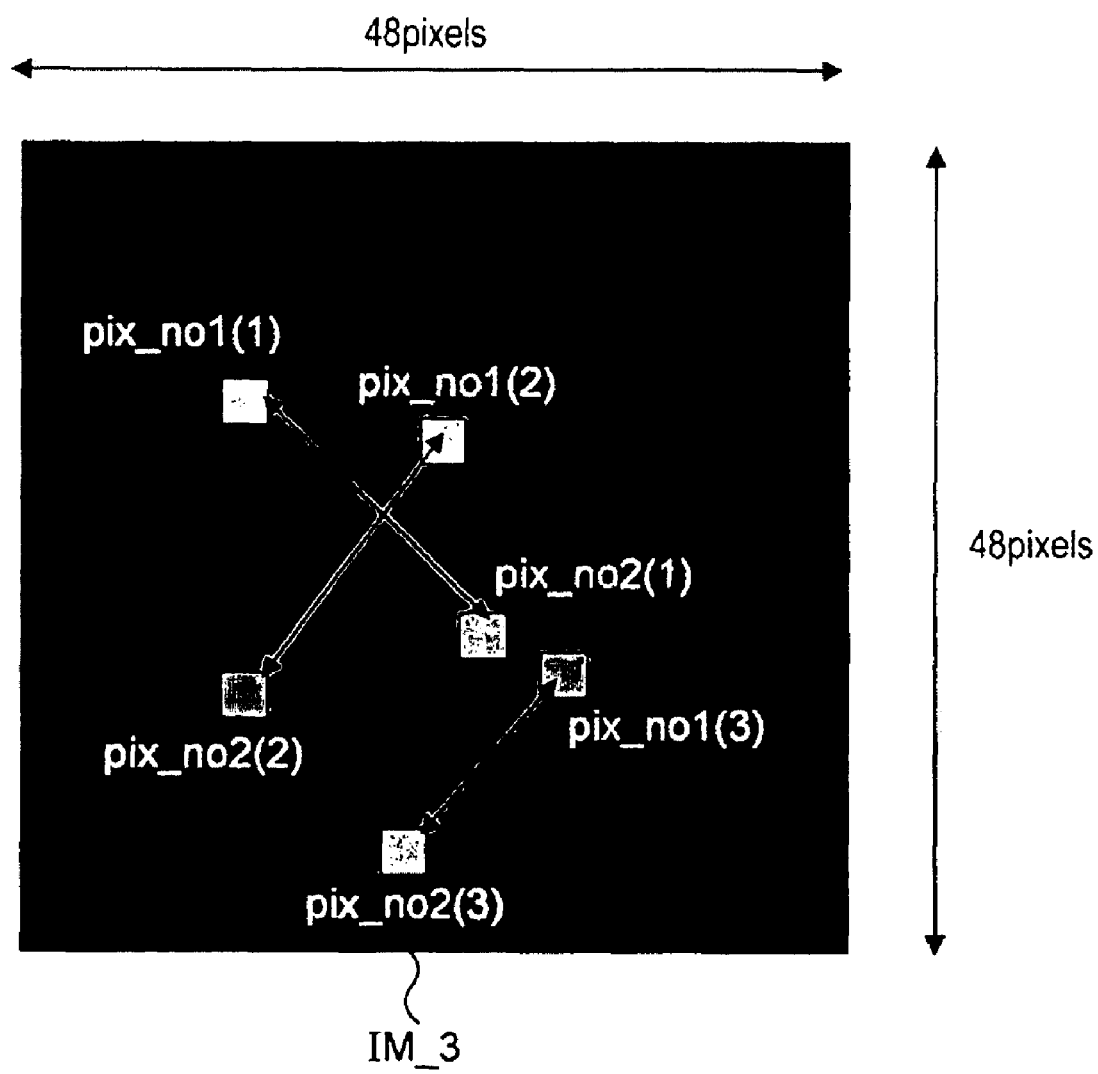
FIG. 19 illustrates a relationship between position information of each set of parameters in the normalization determination dictionary and a normalized face image.

As shown in FIG. 18B, the normalization determination dictionary contains t2 sets (sets of several hundreds), each set containing pix_no1($i$), pix_no2($i$), θ_no(i) and α_no(i). As shown in FIG. 19, pix_no1($i$) and pix_no2($i$) represent two positions in the normalized face image IM-3. FIG. 19 illustrates only three sets for simplicity. θ_no(i) represents a threshold value of a difference between a luminance value at pix_no1($i$) and a luminance value at pix_no2($i$). Further, α_no(i) represents a weight added or subtracted depending on a comparison result of the threshold value θ_no(i) with the difference between the luminance value at pix_no1($i$) and the luminance value at pix_no2($i$). The values of pix_no1($i$), pix_no2($i$), θ_no(i) and α_no(i), though not described in detail here, are acquired using a machine learning algorithm such as AdaBoost.

To measure the normalization score SCORE_no, it is determined whether each set of pix_no1($i$), pix_no2($i$), θ_no(i) and α_no(i) in the face dictionary satisfies equation (8) as shown in FIG. 18A. If it is determined that each set satisfies equation (8), equation (9) is then calculated. If it is determined that each set fails to equation (8), equation (10) is then calculated. In equation (8), pix_no1($i$) represents a luminance value at that position, and pix_no2($i$) represents a luminance value at that position.

$$\text{pix\_no1}(i)-\text{pix\_no2}(i)<\theta\_\text{no}(i) \quad (8)$$

$$\text{SCORE\_no}=\text{SCORE\_no}+\alpha\_\text{no}(i) \quad (9)$$

$$\text{SCORE\_no}=\text{SCORE\_no}-\alpha\_\text{no}(i) \quad (10)$$

The measurement process of the normalization score SCORE_no, not described herein in detail, is substantially identical to the measurement process of the left-eye score SCORE_Ley (see FIG. 17).

In step ST46, the face attribute detector 122 measures the smile score SCORE_sm using the smiling face dictionary as shown in FIG. 12B. The smile score SCORE_sm is referenced to determine whether the state of the normalized face image IM-3 is a smiling face or not.

The measurement process of the smile score SCORE_sm is described below.

Figure 20B:
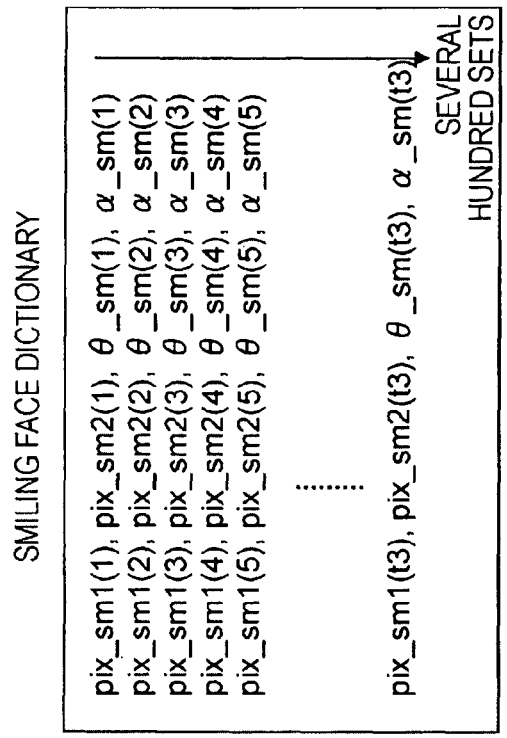
FIGS. 20A and 20B illustrate a smiling face and measurement of a smiling score with the smiling face dictionary used.

As shown in FIG. 20B, the normalization determination dictionary contains t3 sets (sets of several hundreds), each set containing pix_sm1($i$), pix_sm2($i$), θ_sm(i) and α_sm(i). Here, pix_sm1($i$) and pix_sm2($i$) represent two positions in the normalized face image IM-3. Here, θ_sm(i) represents a threshold value of a difference between a luminance value at pix_sm1($i$) and a luminance value at pix_sm2($i$). Further, α_sm(i) represents a weight added or subtracted depending on a comparison result of the threshold value θ_sm(i) with the difference between the luminance value at pix_sm1($i$) and the luminance value at pix_sm2($i$). The values of pix_sm1($i$), pix_sm2($i$), θ_sm(i) and α_sm(i), though not described in detail here, are acquired using a machine learning algorithm such as AdaBoost.

Figure 20A:
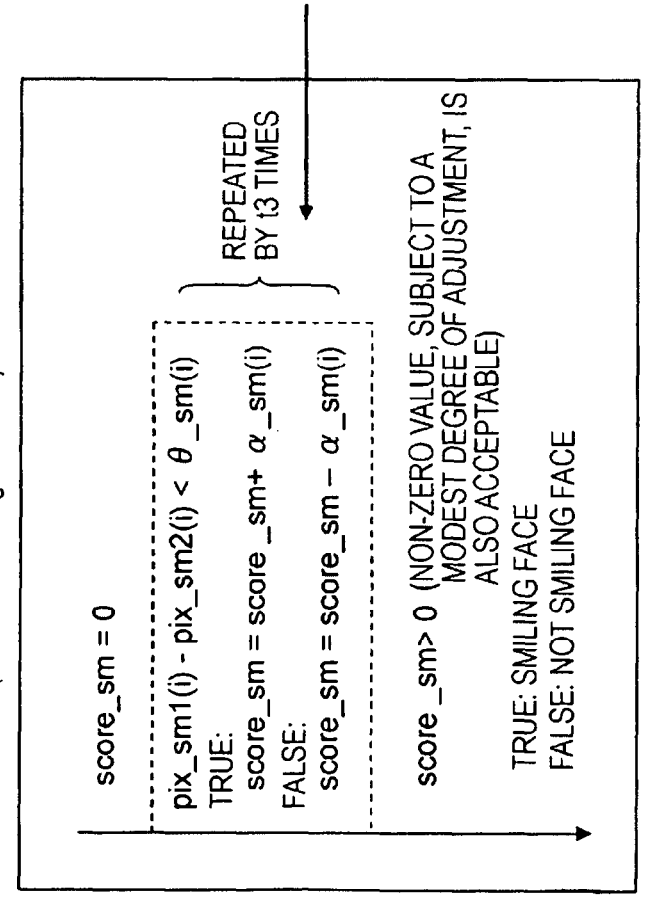

To measure the smile score SCORE_sm, it is determined whether each set of pix_sm1($i$), pix_sm2($i$), θ_sm(i) and α_sm(i) in the face dictionary satisfies equation (11) as shown in FIG. 20A. If it is determined that each set satisfies equation (11), equation (12) is then calculated. If it is determined that each set fails to equation (11), equation (12) is then calculated. In equation (11) pix_sm1($i$) represents a luminance value at that position, and pix_sm2($i$) represents a luminance value at that position.

$$\text{pix\_sm1}(i)-\text{pix\_sm2}(i)<\theta\_\text{sm}(i) \quad (11)$$

$$\text{SCORE\_sm}=\text{SCORE\_sm}+\alpha\_\text{sm}(i) \quad (12)$$

$$\text{SCORE\_sm}=\text{SCORE\_sm}-\alpha\_\text{sm}(i) \quad (13)$$

The measurement process of the smile score SCORE_sm, not described herein in detail, is substantially identical to the measurement process of the left-eye score SCORE_Ley (see FIG. 17).

In step ST47, the face attribute detector 122 outputs, to the sequence controller 124, attribute information (the maximum value of the left-eye score SCORE_Ley, the maximum value of the right-eye score SCORE_Rey, the normalization score SCORE_no, and the smile score SCORE_sm). In step ST48, the face attribute detector 122 ends the face attribute detection process.

Returning to FIG. 4, the sequence controller 124 proceeds from step ST6 to step ST7. In step ST7, the sequence controller 124 determines whether a photographing condition is satisfied. The sequence controller 124 performs this determination based on the attribute information (the maximum value of the left-eye score SCORE_Ley, the maximum value of the right-eye score SCORE_Rey, the normalization score SCORE_no, and the smile score SCORE_sm).

If the left and right eyes have been successfully detected, if the face image has been successfully normalized, and if the smiling face has been successfully detected, the sequence controller 124 determines that the photographing condition is satisfied. If the maximum value of the left-eye score SCORE_Ley is greater than zero, the sequence controller 124 determines the detection of the left eye as being successful. If the maximum value of the right-eye score SCORE_Rey is greater than zero, the sequence controller 124 determines the detection of the right eye as being successful. If the normalization score SCORE_no is greater than zero, the sequence controller 124 determines the normalization of the face image as being successful. Furthermore, if the smile score SCORE_sm is greater than zero, the sequence controller 124 determines the detection of the smiling face as being successful.

A state A of FIG. 21 indicates that the detection of the left eye fails, that the detection of the right eye fails, that the normalization of the face image fails or succeeds, and that the smiling face is detected or not detected. The state A thus fails to satisfy the photographing condition. Since the detection of the left and right eyes fails in this state, the face image detected by the face detector 121 may not be actually a face image, or the face image detected by the face detector 121 may not be fullface. A state B of FIG. 21 indicates that the detection of the left eye succeeds, that the detection of the right eye fails, that the normalization of the face image succeeds, and that the smiling face is detected. The photographing condition is not satisfied. Since one eye is not detected in this state, the face image detected by the face detector 121 may look away.

A state C of FIG. 21 indicates that the detection of the left eye succeeds, that the detection of the right eye succeeds, that the normalization of the face image succeeds, and that the smiling face is detected. The photographing condition is thus satisfied. In this state, the face image detected by the face detector 121 is considered being a smiling face in a fullface position. A state D of FIG. 21 indicates that the detection of the left eye succeeds, that the detection of the right eye succeeds, that the normalization of the face image fails, and that the smiling face is detected. The photographing condition is not satisfied. Although the left and right eyes have successfully detected, the normalization of the face image fails. The face image detected by the face detector 121 may not be actually a face image, or the face attribute detector 122 may detect the eyebrow as the eye.

As described above, the face detector 121 detects a plurality of face images from the captured image IM-O and the face attribute detector 122 then detects face attribute from the plurality of face images. In such a case, the sequence controller 124 performs one of the following processes (1)-(3) in the determination in step ST7 of whether the photographing condition is satisfied or not.

(1) If all the face images satisfy the photographing condition, the photographing condition is determined as being satisfied. (2) If the largest face image in the captured image satisfies the photographing condition, the photographing condition is considered as being satisfied. A plurality of largest face images may be present. In such a case, the photographing condition is considered as being satisfied if all the face images satisfy the photographing condition or if the face image placed at a position closest to the center of the captured image satisfies the photographing condition. (3) The photographing condition is determined as being satisfied if the face image closest to the center of the captured image is considered as satisfying the photographing condition regardless of the size of each face image.

If it is determined in step ST7 that the photographing condition is satisfied, the sequence controller 124 proceeds to step ST8. In step ST8, the sequence controller 124 instructs a related element such as the system controller 104 to photograph the subject. The image information responsive to the captured image output from the imaging unit 102 is supplied to the recording and reproducing unit 106 via the storage unit 111 and recorded onto a recording medium such as a memory card (not shown). The imaging unit 102 flashes as necessary. The sequence controller 124 proceeds from step ST8 to step ST9 to complete the series of control steps.

If it is determined in step ST7 that the photographing condition is not satisfied, the sequence controller 124 proceeds to step ST10. In step ST10, the sequence controller 124 determines whether a notification condition is satisfied or not. If the notification condition is satisfied, the subject is notified that the photographing operation is performed if a condition of a smiling face is satisfied. If the detection of the left and right eyes is successful, if the normalization of the face image is successful, but if no smiling face is detected, the sequence controller 124 determines the notification condition as being satisfied.

A state A of FIG. 22 indicates that the detection of the left eye fails, that the detection of the right eye fails, that the normalization of the face image fails or succeeds, and that the smiling face is detected or not detected. The state A thus fails to satisfy the notification condition. A state B of FIG. 22 indicates that the detection of the left eye succeeds, that the detection of the right eye fails, that the normalization of the face image succeeds, and that the smiling face is detected. The notification condition is not satisfied. A state C of FIG. 22 indicates that the detection of the left eye succeeds, that the detection of the right eye succeeds, that the normalization of the face image succeeds, and that the smiling face is not detected. The notification condition is satisfied because the photographing condition is satisfied if the smiling face is detected. A state D of FIG. 22 indicates that the detection of the left eye succeeds, that the detection of the right eye succeeds, that the normalization of the face image fails, and that the smiling face is detected. The notification condition is not satisfied.

If it is determined in step ST10 that the notification condition is satisfied, the sequence controller 124 proceeds to step ST11. In step ST11, the sequence controller 124 sends a notification instruction to the system controller 104. In response to the notification instruction from the sequence controller 124, the system controller 104 performs a notification process. The notification process may be performed by light emission of the LED 109, an audio outputting from the speaker 110, or both.

Figure 23A:
FIGS. 23A and 23B illustrate a light emission pattern in notification based on light emission of a light-emitting diode (LED).
Figure 23B:
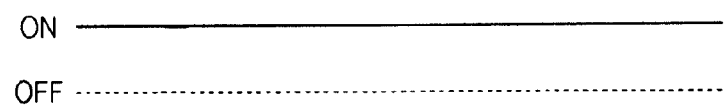

FIGS. 23A and 23B illustrate an emission pattern of the imaging unit 102. FIG. 23A illustrates a periodic light emission pattern and FIG. 23B illustrates a continuous light emission pattern. If the notification process is the audio outputting from the speaker 110, an audio message such as "say cheese," or "smile" to prompt the subject to smile is output.

The sequence controller 124 returns from step ST11 to step ST3 to repeat the same process described above. If it is determined in step ST10 that the notification condition is not satisfied, the sequence controller 124 immediately return to step ST3.

As described above, the digital still camera 100 of FIG. 1 normalizes the position, the angle and the size of the face in accordance with the detected position of the left and right eyes, and detects the smiling face using the image information of the normalized face image IM-3. In comparison with the apparatus that detects the smiling face using the image information of an unnormalized face image, the detection accuracy of the smiling face is increased, and the accuracy of the automatic photographing operation for photographing a person at the moment he or she smiles is increased.

The digital still camera 100 of FIG. 1 determines whether the normalization process has been successfully completed, using the image information of the normalized face image IM-3. If the normalization has been successfully completed, and if the smiling face is detected, the digital still camera 100 photographs the subject. The face image detected by the face detector 121 may not be actually a face image, the face image detected by the face detector 121 may be not a face image in a fullface position, or the eyebrow may be detected as the eye by the face attribute detector 122 and erroneously normalized. In such a case, the normalization is determined as a failure even if the smiling face is detected. An erratic photographing operation is thus avoided.

In the digital still camera 100 of FIG. 1, the number of pixels in the face image IM-3 normalized in accordance with the detected positions of the left and right eyes and used in the smiling face detection (48 pixels by 48 pixels) is smaller than the number of pixels of the normalized face image IM-2 for use in the eye detection (80 pixels by 80 pixels). The amount of memory used in the smiling face detection is conserved and high-speed processing is thus achieved. The normalized face image IM-2 needs to have a predetermined number of pixels or more (predetermined resolution) to detect accurately the position of the eyes. On the other hand, the normalized face image IM-3 is used to detect a general feature expanding over the entire face (the normalization determination score and smiling score), and pixels of a small number still satisfactorily work.

The detection of the smiling face may cause the digital still camera 100 of FIG. 1 to perform the photographing operation. In such a case, the subject may be notified that the digital still camera 100 is ready to perform the photographing operation as soon as the condition of the smiling face becomes satisfied. This notification is performed by causing the LED 109 to emit light or the speaker 110 to output an audio output. The subject is thus prompted to smile. The automatic photographing operation is thus smoothly performed.

In accordance with the above-described embodiments, the particular image detected from the captured image is a face image. The present invention is applicable to an imaging apparatus that detects a non-face image from the capture image, and automatically performs the photographing operation if the non-face image satisfies a predetermined condition.

In accordance with the above-described embodiments, the particular expression detected from the face image is a smiling face. Alternatively, the particular expressions may include a crying face and an angry face.

In accordance with the above-described embodiments, the face feature detected from the face image is the eyes. The face features are not limited to the eyes, and include the nose, and the ears, for example.

In accordance with the above-described embodiments, the normalization process (affine transform) is performed on the normalized face image IM-2 so that the detected positions of the left and right eyes are predetermined coordinates. The normalized face image IM-3 having the position, the angle and the size of the face all normalized thus results. It is sufficient if a normalized image having at least one of the position, the angle and the size of the face normalized is obtained.

In accordance with the above-described embodiments, the sequence controller 124 performs in step ST44 the normalization process (affine transform) on the premise that the left and right eyes are at the predetermined positions even if the left and right eyes have not been successfully detected, and then performs the process steps in step ST45 and step ST46 in the image attribute detection process of FIG. 11. If the left and right eyes are not detected, steps ST44 through ST46 may be skipped because steps ST44 through ST46 become meaningless.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing an image, comprising:
   a face detector that detects a face image of a subject contained in a captured image based on image information of the captured image supplied from an imaging unit;
   a face feature detector that detects a face feature contained in the face image based on image information of the face image detected by the face detector;
   a normalizer that normalizes the face image detected by the face detector based on a detected position of the face feature detected by the face feature detector, generates a normalized face image, and measures a normalization score corresponding to the normalized face image;
   a face expression detector that detects a face expression contained in the face image based on image information of the normalized face image generated by the normalizer; and
   a photographing controller that determines whether a normalization operation of the face image has been successfully completed based on the normalization score measured by the normalizer, and instructs the imaging unit to perform a photographing operation in response to the face expression detected by the face expression detector only if it is determined that the normalization operation of the face image has been successfully completed.

2. The image processing apparatus according to claim 1, wherein the normalizer normalizes the face image in terms of at least one of a position of the face, an angle of the face, and a size of the face.

3. The image processing apparatus according to claim 1, wherein the face feature to be detected by the face feature detector is the eyes of the subject.

4. The image processing apparatus according to claim 1, wherein the number of pixels in the normalized face image generated by the normalizer is smaller than the number of pixels of the face image prior to the normalization operation thereof.

5. The image processing apparatus according to claim 1, wherein the face expression to be detected by the face expression detector is a smiling face.

6. The image processing apparatus according to claim 1, further comprising:
   a notifier that notifies for the subject that if the face expression is not detected by the face expression detector a photographing operation is performed upon the face of the subject changing to the face expression.

7. The image processing apparatus according to claim 1, further comprising:
   the imaging unit that captures the image of the subject and acquires image information of the captured image of the subject.

8. An image processing method for processing an image, comprising:
   detecting an image of a face of a subject contained in a captured image based on image information of a captured image supplied from an imaging unit;
   detecting a face feature contained in the face image based on image information of the detected face image;
   normalizing the detected face image based on a detected position of the detected face feature to generate a normalized face image;
   measuring a normalization score corresponding to the normalized face image;
   detecting a face expression contained in the face image based on image information of the generated normalized face image;
   determining whether a normalization operation of the face image has been successfully completed based on the measured normalization score; and
   instructing the imaging unit to perform a photographing operation in response to the detected face expression only if the normalization determination unit determines that the normalization operation of the face image has been successfully completed.

9. The image processing apparatus according to claim 1, wherein the normalizer normalizes the face image in terms of a position of the face, an angle of the face, and a size of the face.

10. The image processing apparatus according to claim 3, wherein the face feature detector measures a left eye score corresponding to detection of a left eye of the subject and a right eye score corresponding to detection of a right eye of the subject.

11. The image processing apparatus according to claim 10, wherein the photographing controller that determines whether detection of the right eye and the left eye of the subject has been successfully completed based on the left eye score and right eye score measured by the face feature detector, and instructs the imaging unit to perform a photographing operation in response to the face expression detected by the face expression detector only if it is determined that the normalization operation of the face image has been successfully completed and that detection of the right eye and the left eye of the subject has been successfully completed.

12. The image processing apparatus according to claim 5, wherein the face expression detector measures a smile score corresponding to the detection of the smiling face.

13. The image processing apparatus according to claim 12, wherein the photographing controller determines whether detection of the smiling face has been successfully completed based on the smile score, and instructs the imaging unit to perform a photographing operation in response to the face expression detected by the face expression detector only if it is determined that the normalization operation of the face image has been successfully completed and that detection of the smile has been successfully completed.

* * * * *